United States Patent
Kimura et al.

(10) Patent No.: US 11,042,695 B2
(45) Date of Patent: Jun. 22, 2021

(54) INFORMATION PROCESSING APPARATUS AND NON-TRANSITORY COMPUTER READABLE MEDIUM FOR GENERATING INPUT SCREEN INFORMATION

(71) Applicant: FUJIFILM BUSINESS INNOVATION CORP., Tokyo (JP)

(72) Inventors: Shunichi Kimura, Kanagawa (JP); Satoshi Kubota, Kanagawa (JP); Takuya Sakurai, Kanagawa (JP); Yutaka Koshi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 99 days.

(21) Appl. No.: 16/121,055

(22) Filed: Sep. 4, 2018

(65) Prior Publication Data

US 2019/0294662 A1 Sep. 26, 2019

(30) Foreign Application Priority Data

Mar. 22, 2018 (JP) .............................. JP2018-055194

(51) Int. Cl.
*G06F 40/174* (2020.01)
*G06K 9/00* (2006.01)
*G06F 3/0488* (2013.01)
*G06F 3/0354* (2013.01)
*G06F 40/171* (2020.01)

(52) U.S. Cl.
CPC ........ *G06F 40/174* (2020.01); *G06F 3/03545* (2013.01); *G06F 3/04883* (2013.01); *G06F 40/171* (2020.01); *G06K 9/00483* (2013.01); *G06K 2209/01* (2013.01)

(58) Field of Classification Search
CPC ............. G06F 3/04883; G06F 3/03545; G06F 40/171; G06F 40/174
See application file for complete search history.

(56) References Cited

U.S. PATENT DOCUMENTS

| 5,717,939 | A | * | 2/1998 | Bricklin | ................ G06F 40/166 715/212 |
| 8,832,590 | B1 | * | 9/2014 | Al-Mohssen | ............ G09G 5/00 715/785 |
| 9,275,029 | B2 | * | 3/2016 | Padgett | ................ G06F 3/04895 |
| 10,444,724 | B2 | * | 10/2019 | Elumalai | ............ G05B 19/0423 |

(Continued)

FOREIGN PATENT DOCUMENTS

| JP | H6-131493 A | 5/1994 |
| JP | H7-121654 A | 5/1995 |

(Continued)

OTHER PUBLICATIONS

Morland, "Human Factors Guidelines for Terminal Interface Design," Communications of the ACM, Jul. 1983, vol. 26, No. 7, pp. 484-494. (Year: 1983).*

*Primary Examiner* — Amelia L Tapp

(74) *Attorney, Agent, or Firm* — Oliff PLC

(57) ABSTRACT

An information processing apparatus includes an obtaining unit that obtains a number of times of data inputting required for each of plural input items to which operators are to input data and an input screen information generation unit that generates, for the operators on a basis of the obtained number of times of data inputting, input screen information to which the operators are to input data.

21 Claims, 14 Drawing Sheets

(56) References Cited

U.S. PATENT DOCUMENTS

| | | | | |
|---|---|---|---|---|
| 10,853,567 B2* | 12/2020 | Hegde | ................. | G06Q 40/06 |
| 2003/0214531 A1* | 11/2003 | Chambers | ............ | G06F 40/171 |
| | | | | 715/764 |
| 2003/0221165 A1* | 11/2003 | Young | ..................... | G06F 8/38 |
| | | | | 715/222 |
| 2006/0007189 A1* | 1/2006 | Gaines, III | ............ | G06F 40/174 |
| | | | | 345/179 |
| 2006/0123331 A1* | 6/2006 | Hightower | ............ | G06F 40/174 |
| | | | | 715/224 |
| 2011/0214067 A1* | 9/2011 | Tanaka | ................. | G06F 40/174 |
| | | | | 715/745 |
| 2014/0363074 A1* | 12/2014 | Dolfing | ............. | G06K 9/00422 |
| | | | | 382/156 |
| 2014/0363082 A1* | 12/2014 | Dixon | ............... | G06K 9/00402 |
| | | | | 382/187 |
| 2015/0317296 A1* | 11/2015 | Vohra | .................. | G06F 16/93 |
| | | | | 715/221 |

FOREIGN PATENT DOCUMENTS

| | | |
|---|---|---|
| JP | H9-62758 A | 3/1997 |
| JP | 2016-212812 A | 12/2016 |

* cited by examiner

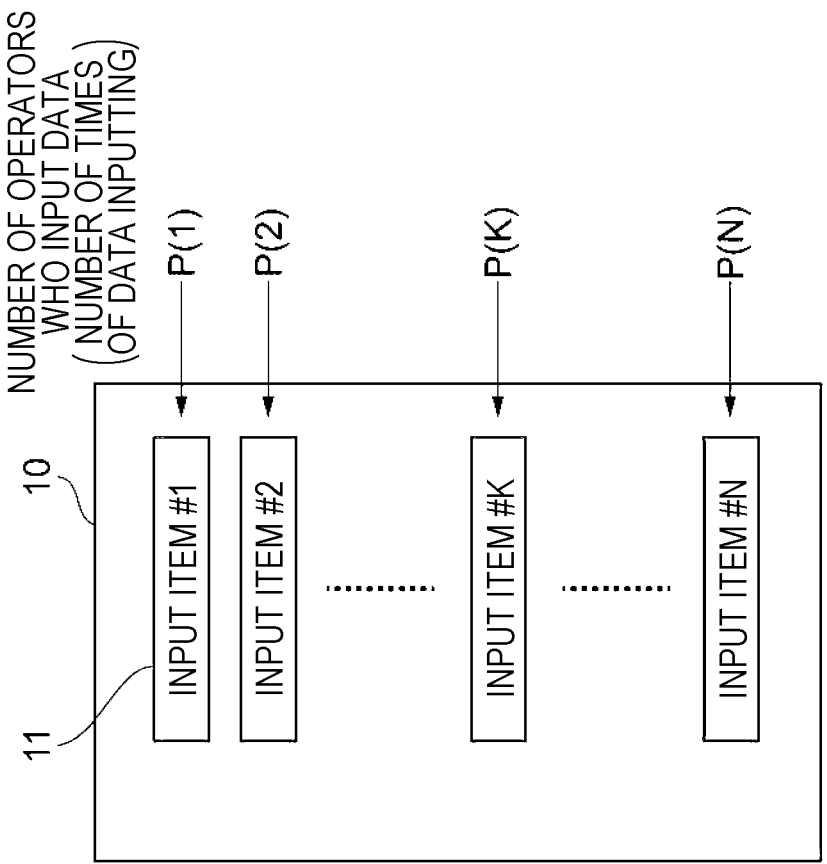
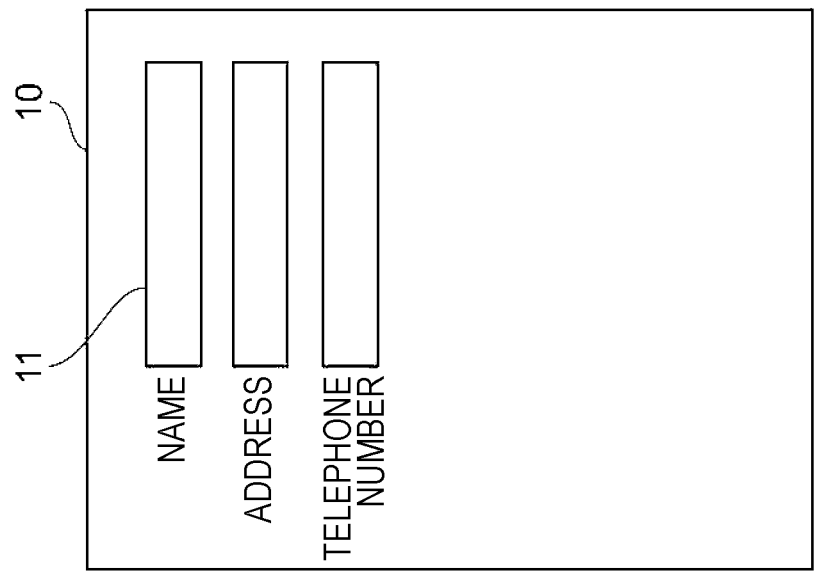

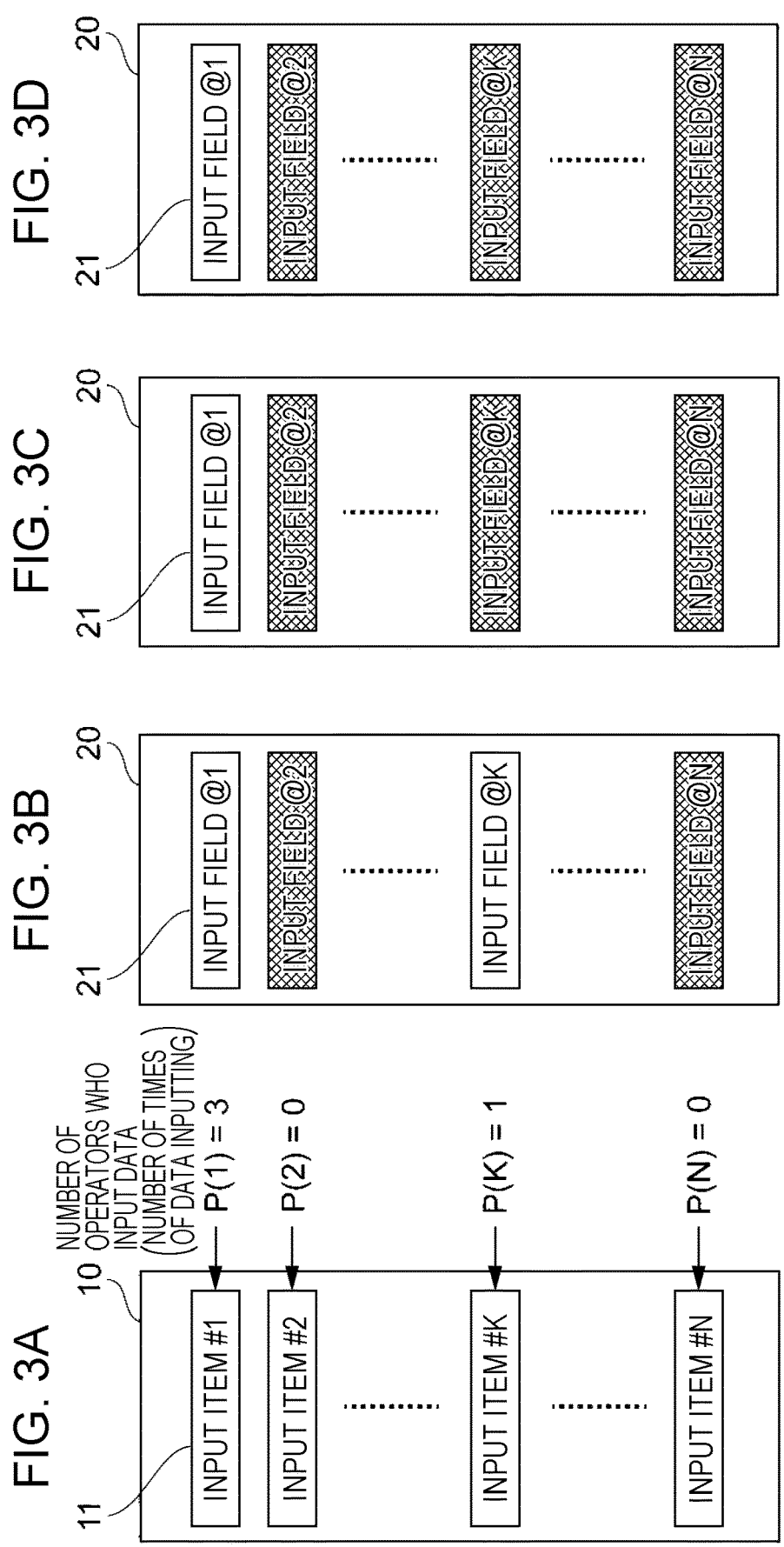

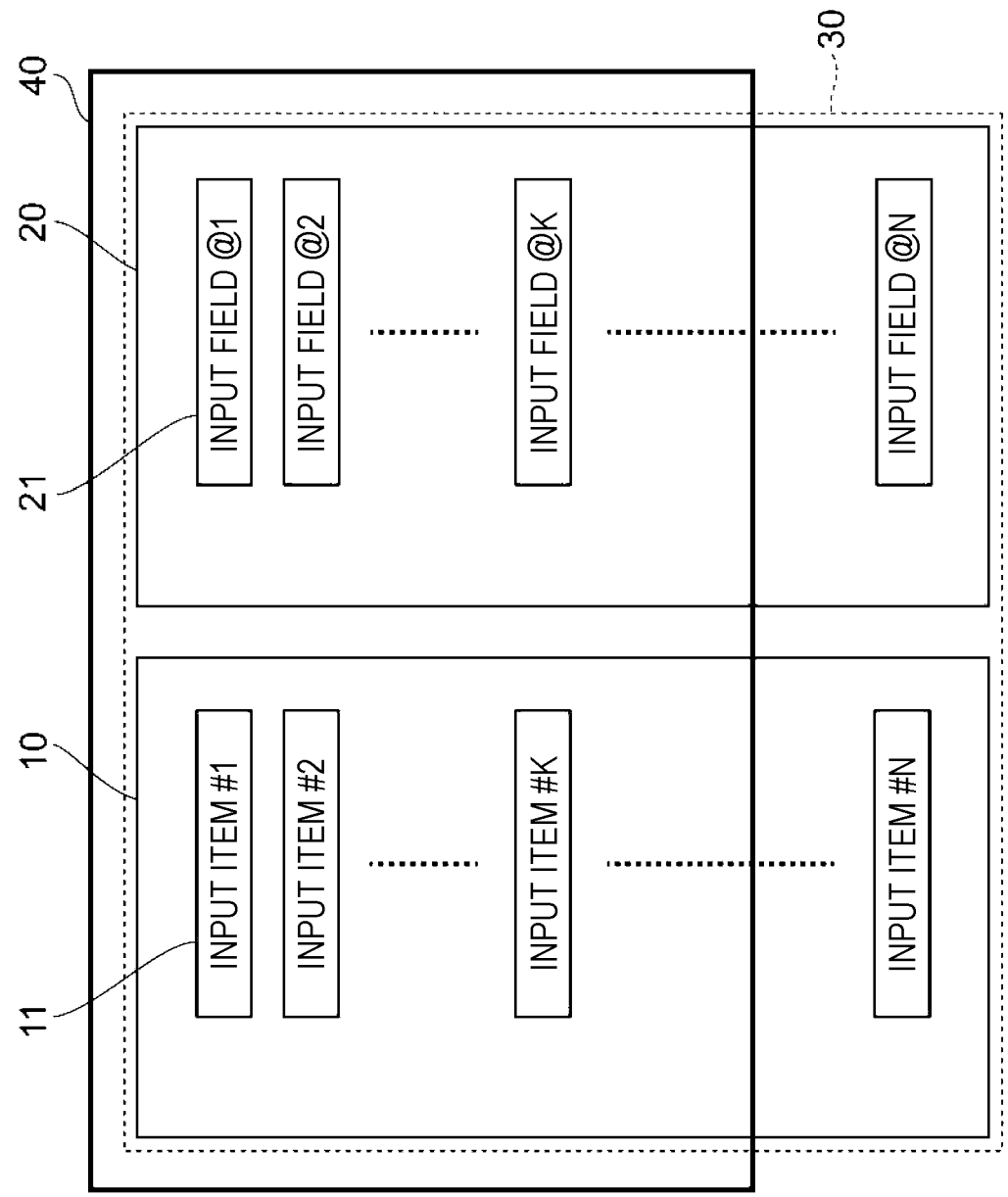

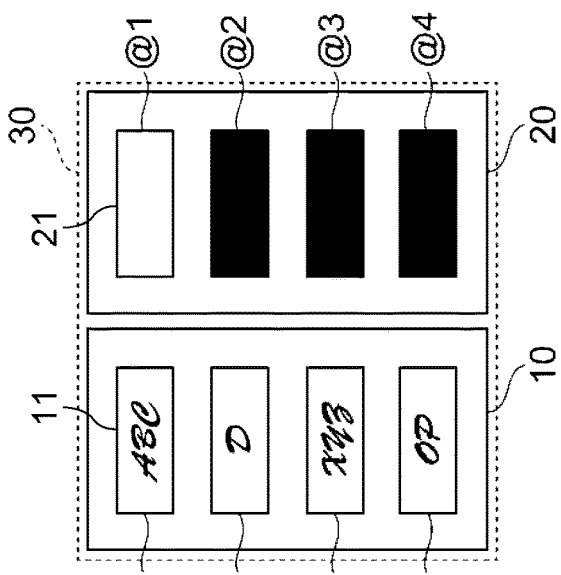
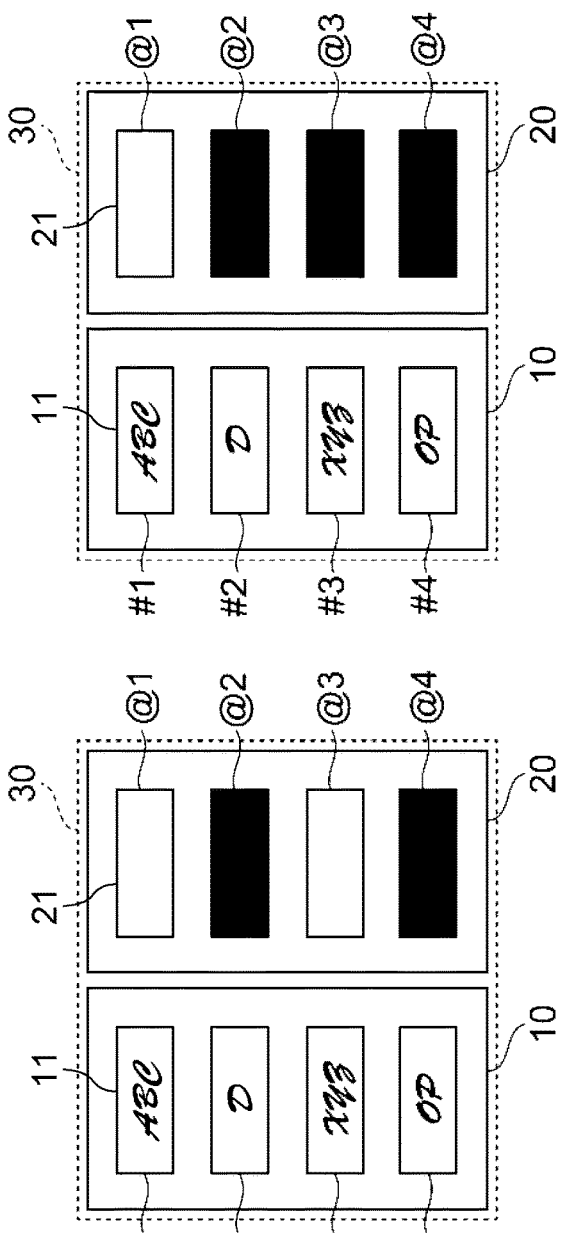
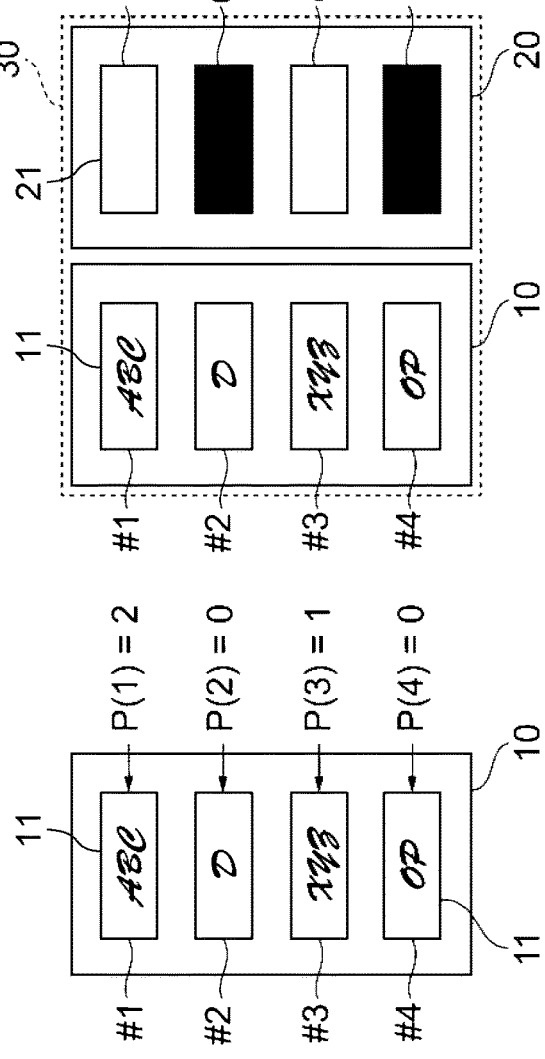

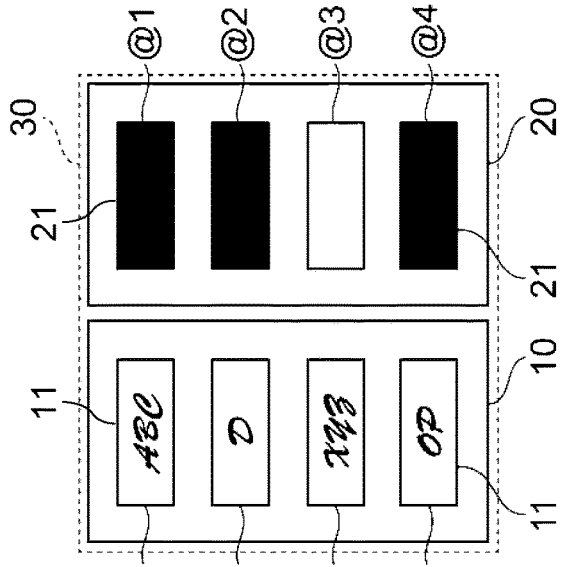
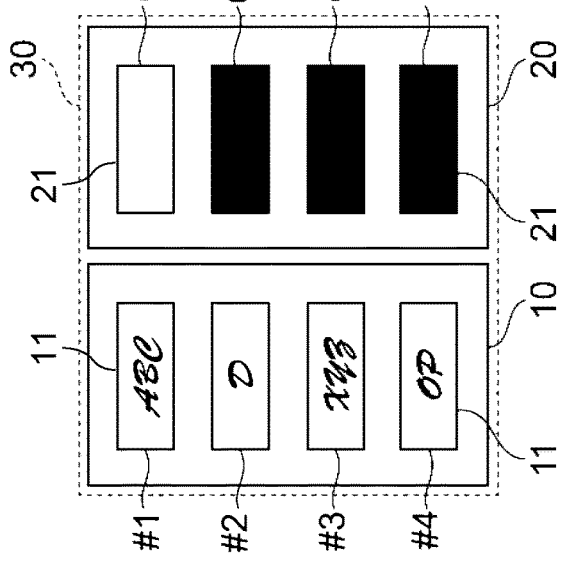
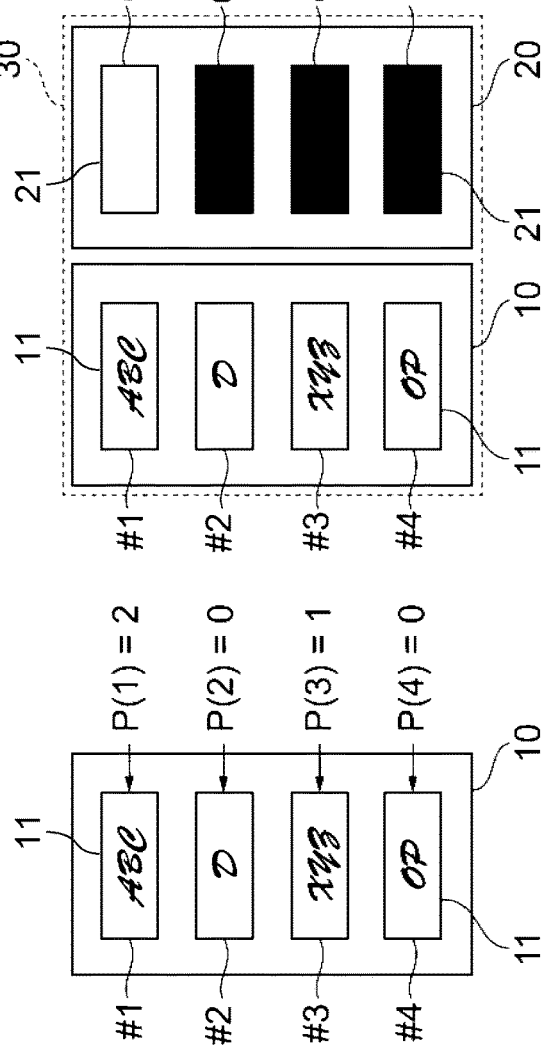

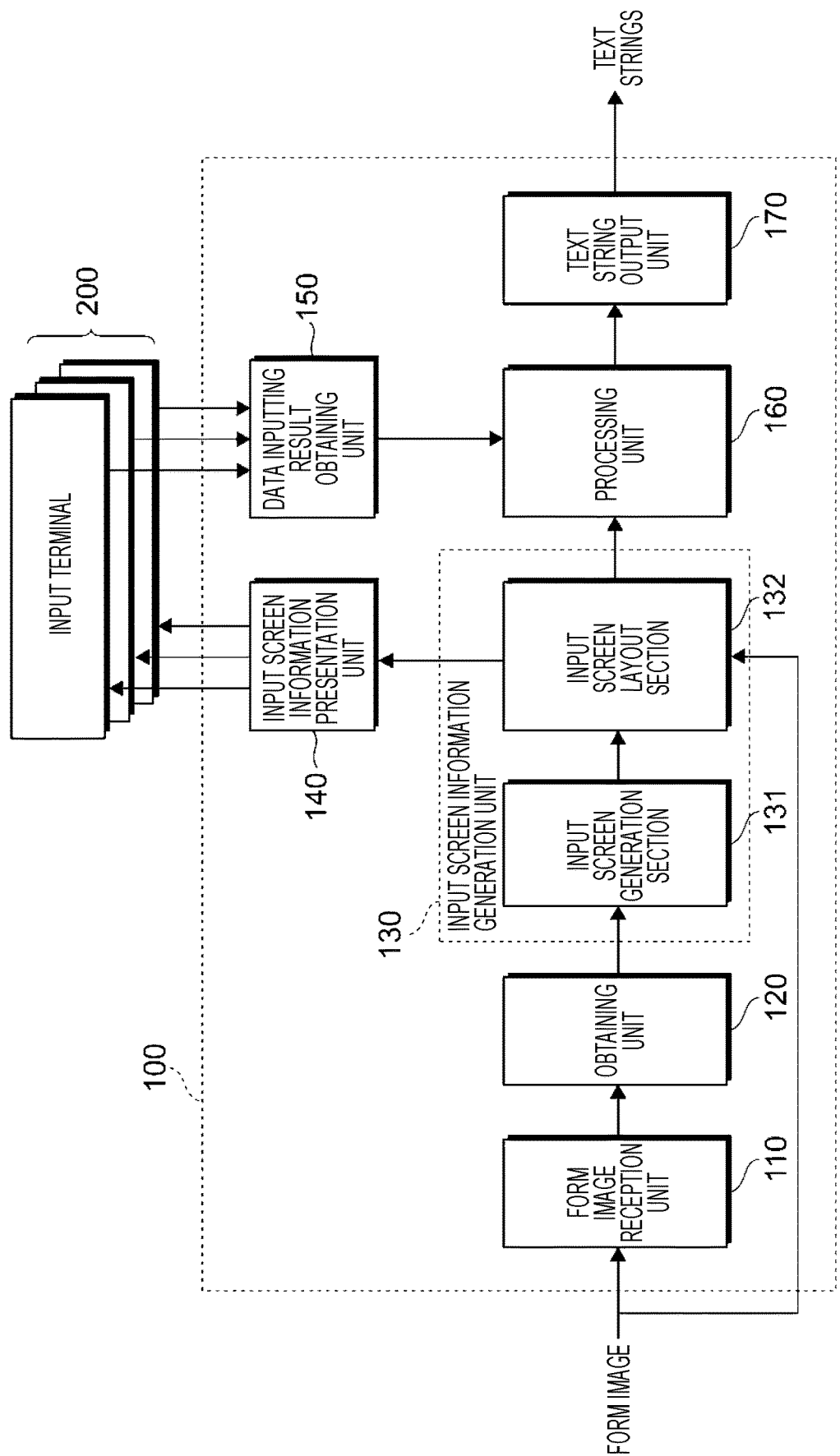

INFORMATION PROCESSING APPARATUS AND NON-TRANSITORY COMPUTER READABLE MEDIUM FOR GENERATING INPUT SCREEN INFORMATION

CROSS-REFERENCE TO RELATED APPLICATIONS

This application is based on and claims priority under 35 USC 119 from Japanese Patent Application No. 2018-055194 filed Mar. 22, 2018.

BACKGROUND

(i) Technical Field

The present disclosure relates to an information processing apparatus and a non-transitory computer readable medium.

(ii) Related Art

Japanese Unexamined Patent Application Publication No 06-131493 discloses a character recognition apparatus including display control means for obtaining character data regarding candidate characters and a degree of reliability from recognition result storage means and selecting, from among at least three degrees of emphasis in display corresponding to degrees of reliability, a degree of emphasis corresponding to the degree of reliability of the candidate characters to set the degree of emphasis and display means for displaying the candidate characters on the basis of the degree of emphasis in display set by the display control means.

Japanese Unexamined Patent Application Publication No. 07-121654 discloses a character recognition display apparatus that displays a result of character recognition performed on a handwritten character string input as an image. The character recognition display apparatus includes character display means for displaying image information regarding the character string and the result of the character recognition corresponding to the image information and cursor display means for displaying a cursor at rejected characters, which have not been recognized in the character recognition, and a part of the image information corresponding to the rejected characters.

Japanese Unexamined Patent Application Publication No. 09-062758 discloses a form recognition system including a mode selection unit that counts the number of items that have not been recognized by a character recognition unit and that, if the number of items is smaller than a preset threshold, selects a partial correction mode, in which an image including at least the items that have not been recognized is displayed on an output apparatus and an operator is prompted to correct data corresponding to the items, or that, if the number of items is equal to or larger than the preset threshold, selects an all input mode, in which an image of the entirety of a form is displayed on a display output unit and the operator is prompted to input data to all the items.

Japanese Unexamined Patent Application Publication No. 2016-212812 discloses an information processing apparatus including classification means for classifying a character recognition target into one of three types, extraction means for, if the classification means classifies the character recognition target into a first type, extracting a result of character recognition performed on the character recognition target, first control means for, if the classification means classifies the character recognition target into a second type, extracting a result of character recognition performed on the character recognition target and prompting an operator to manually input the character recognition target, and second control means for, if the classification means classifies the character recognition target into a third type, prompting a plurality of operators to manually input the character recognition target.

SUMMARY

In data inputting in which a person inputs content of a form as data, accuracy is required. A form might include a plurality of items to which data is to be input, and the number of times of data inputting to be performed might differ between the items because characteristics of the items vary, that is, for example, some items require accuracy and various kinds of data are to be input to other items. If the number of times of data inputting to be performed is the same between the items in this case, redundant inputting operations are undesirably performed for items that do not require multiple inputting operations. As a result, the overall work efficiency of data inputting decreases.

Aspects of non-limiting embodiments of the present disclosure aim to achieve a higher level of work efficiency of data inputting than when an input screen is generated for each operator without taking into consideration differences between characteristics of items.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an obtaining unit that obtains a number of times of data inputting required for each of a plurality of input items to which operators input data and an input screen information generation unit that generates, for the operators on a basis of the obtained number of times of data inputting, input screen information to which the operators input data.

BRIEF DESCRIPTION OF THE DRAWINGS

An exemplary embodiment of the present disclosure will be described in detail based on the following figures, wherein:

FIGS. 1A and 1B are diagrams illustrating an outline of data inputting. FIG. 1A illustrates a specific example and FIG. 1B illustrates a generalized example;

FIGS. 3A to 3D are diagrams illustrating a relationship between a form image and input screens according to an exemplary embodiment: FIG. 3A illustrates the form image and FIGS. 3B to 3D illustrate the input screens;

FIG. 4 is a diagram illustrating an example of a display area of each of display units of input terminals used by operators;

FIG. 5A illustrates a form image and FIG. 5B illustrates input screen information;

FIGS. 6A to 6C are diagrams illustrating a case where the maximum value of the number of operators who input data (the number of times of data inputting) for the input items is two: FIG. 6A illustrates the form image and FIGS. 6B and 6C illustrate input screen information;

FIGS. 7A to 7C are diagrams illustrating an example of input screen information in a second process illustrated in FIG. 2: FIG. 7A illustrates the form image and FIGS. 7B and 7C illustrate the input screen information;

FIG. 8A illustrates the form image and FIG. 8B illustrates the input screen information;

FIG. 9 is a diagram illustrating an example of the functional configuration of an image processing apparatus that generates input screen information for data entry;

FIG. 13A illustrates a case where input fields to which data is to be input are blank and input fields to which data is not to be input are provided with character strings; FIG. 13B illustrates a case where input fields to which data is not to be input are displayed in black; FIG. 13C illustrates a case where input fields to which data is not to be input are hatched; and FIG. 13D illustrates a case where a cursor skips input fields to which data is not to be input; FIG. 14A illustrates a case where reference images in a form image corresponding to input items to which data is not to be input are blank and FIG. 14B illustrates a case where reference images in the form image corresponding to the input items to which data is not to be input are hatched.

DETAILED DESCRIPTION

Figure 2:
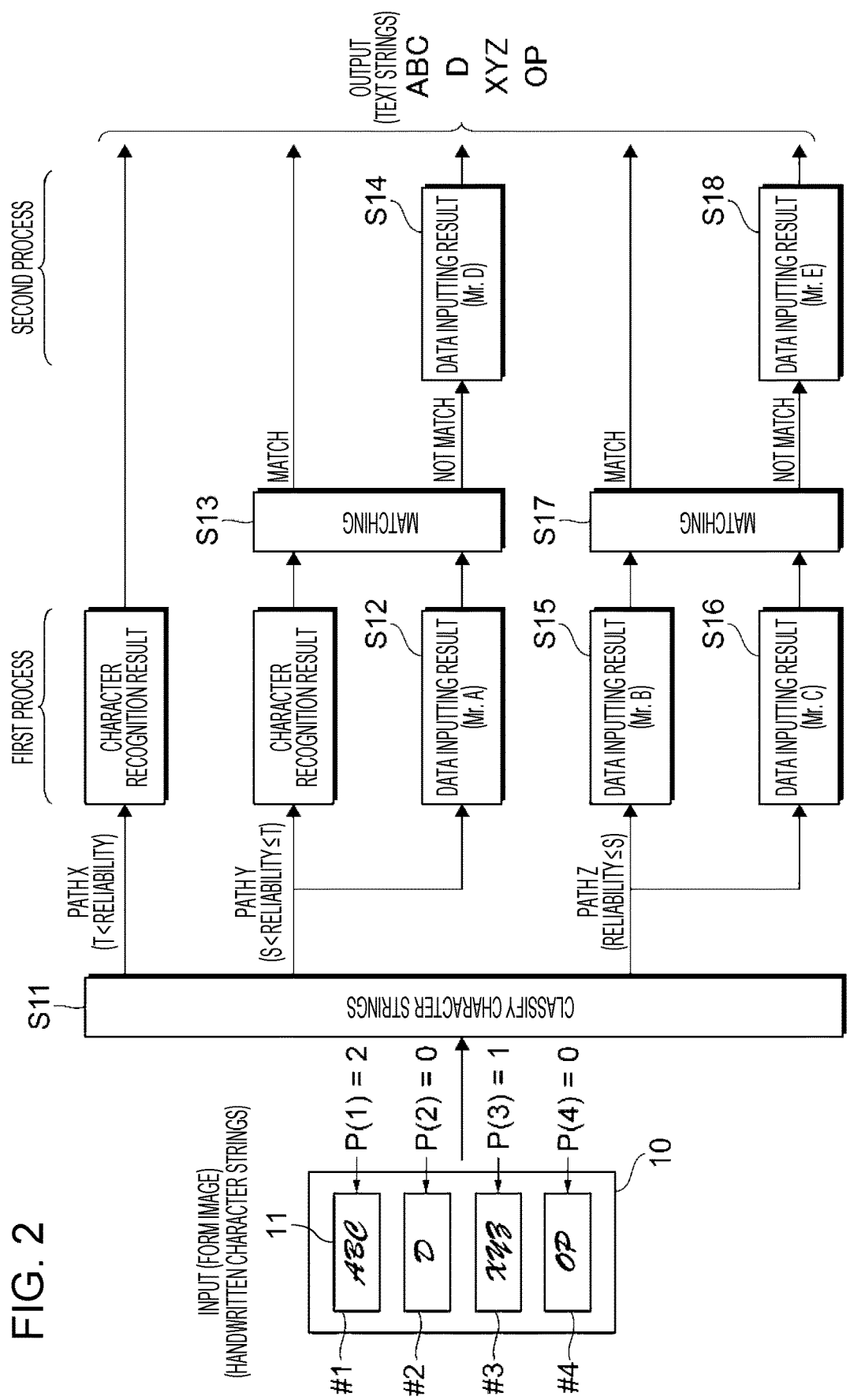
FIG. 2 is a flowchart illustrating an example of data entry in which data inputting is performed.

In data entry, character strings and codes (sheet information) written on a sheet (form) are converted into data (text strings). That is, data entry is an operation for inputting data in which information (sheet information or image information regarding a sheet) including character strings is input and text strings (text information) are then output: as data. Information including character strings can be image information obtained by scanning a sheet on which the character strings are written or image information regarding the character strings written on an electronic device such as a tablet and stroke information regarding the character strings.

A process for outputting text string data from input information is performed by a character recognition device such as an optical character recognition (OCR) device or a person (hereinafter referred to as an "operator") who inputs the text string data using a keyboard or the like or utters the text string data as speech sounds while referring to handwritten character strings. The process for outputting text string data from input information will be referred to as "data inputting".

A form might include a plurality of items to which data is to be input, and the number of times of data inputting to be performed might differ between the items because characteristics of the items vary, that is, for example, some items require accuracy and various kinds of data are to be input to other items. Items to be subjected to data in putting will be referred to as "input items".

An exemplary embodiment (present exemplary embodiment) of the present disclosure will be described in detail hereinafter with reference to the accompanying drawings.

Exemplary Embodiment

First, data inputting will be described.

FIGS. 1A and 1B are diagrams illustrating an outline of the data inputting. FIG. 1A illustrates a specific example, and FIG. 1B illustrates a generalized example.

As illustrated in FIG. 1A, sheet information (form image 10) includes a plurality of input items 11 in which handwritten character strings are written. In the input items 11, for example, a name, an address, and a telephone number are written. Data is then input to the input items 11 to obtain text strings. It is assumed here that the number of times of data inputting differs between the input items 11.

The number of times of data inputting is set to two for the name and the address and one for the telephone number in advance, for example, in consideration of characteristics of the input items 11. It is desirable to avoid inputting errors especially for input items whose errors can cause serious trouble, such as a name and a domicile of origin. The data inputting, therefore, is desirably performed a plurality of times. In addition, since numbers and katakana are simple in shape, inputting errors hardly occur in recognition process of these characters. The number of times of data inputting, therefore, may be small for such characters. Use of a character recognition device might be enough to recognize such characters.

Alternatively, the number of times of data inputting may be determined in advance on the basis of the number of characters included in the input items 11, such as once for four characters or fewer and twice for five characters and more. When the number of characters is small, recognition errors and inputting errors hardly occur.

The number of times of data inputting may be determined on the basis of another criterion. As a result, operators do not perform redundant data inputting for input items for which data inputting need not be performed multiple times.

Here, sheet information is assumed to be the form image 10 obtained by converting a sheet into image data using a scanner, a camera, or the like. Images corresponding to the form image 10 and the input items 11 extracted from the form image 10 will be referred to as "reference images".

As illustrated in FIG. 1B, in a generalized example, the number of input items 11 is denoted by N (N is an integer equal to or larger than 1). That is, the input items 11 include input items #1 to #N. Zero to M operators input data to the input items 11 (M is an integer equal to or larger than 1). Each operator performs data inputting once for each input item 11 and does not perform redundant (two or more operations of) data inputting.

The number of operators who input data to a K-th input item #K (the number of operators who input data) is denoted by P(K) (K=1, 2, ..., N). That is, P(1) operators input data to the first input item #1. P(N) operators input data to the N-th input item #N, A maximum value of P(K) is M. As described later, there might not necessarily be an input item #K with which P(K)=M.

Since each operator performs data inputting once for each input item 11 here and does not perform redundant (two or more operations of) data inputting, the number of operators who input data K indicates the number of times of data inputting. The number of operators who input data. P(K), therefore, might be referred to as the "number of times of data inputting P(K)". The number of operators who input data P(K) might be referred to as the "number of operators P(K)", and the number of times of data inputting P(K) might be referred to as the "number of times P(K)", P(K) might be abbreviated as "P".

FIG. 2 is a flowchart illustrating an example of data entry in which data inputting is performed. FIG. 2 illustrates a case where handwritten character strings of four input items 11 (input items #1 to #4) are output as text strings. In the form image 10, handwritten character strings "ABC", "D", "XYZ", and "OP" are written in the input items #1 to #4, respectively.

The number of operators who input data (the number of times of data inputting) P is set to two for the input item #1 (P(1)=2), zero for the input item #2 (P(2)=0), one for the input item #3 (P(3)=1), and zero for the input item #4 (P(4)=0).

A data entry process will be described hereinafter.

A character recognition device or the like performs a recognition process in image areas corresponding to the four input items 11 (the input items #1 to #4) included in the form image 10 to recognize the written character strings. The character strings are then classified into three paths (step S11 in FIG. 2). The three paths correspond to different degrees of reliability of character recognition performed by the character recognition device. If reliability exceeds a predetermined threshold T (T<reliability), the reliability is high. If reliability is lower than the threshold T but exceeds a predetermined threshold S (S<reliability≤T), the reliability is moderate. If reliability is equal to or lower than the threshold S (reliability≤S), the reliability is low, T<reliability may be T≤reliability, S<reliability≤T may be S≤reliability<T, and reliability≤S may be reliability<S.

The reliability of character recognition indicates the accuracy of character recognition at a time when a handwritten character string is subjected to the character recognition performed by the character recognition device. When the accuracy is high, it is highly probable that a character string has been correctly recognized. When the accuracy is low, a character string might have been erroneously recognized. When the number of character strings (or characters) is small, for example, the accuracy of character recognition is usually high. When the number of character strings (or characters) is large, on the other hand, the accuracy of character recognition is usually low. The accuracy of character recognition also depends on the complexity of characters (the number of strokes). That is, the reliability of character recognition depends on handwritten character strings written in the input items 11. The number of operators who input data (the number of times of data inputting) for the input items #1 to #4 is set as described above in accordance with the handwritten character strings written in the input items #1 to #4.

The reliability of character recognition may be determined after results of the character recognition are obtained, and paths may be set in accordance with the determined reliability of character recognition.

Here, a path X is used when the reliability is high (T<reliability), a path Y is used when the reliability is moderate (S<reliability≤T), and a path Z is used when the reliability is low (reliability≤S).

In the path X, a result of the character recognition (text string) obtained in step S11 is output as a text string as is. That is, in the path X, the number of operators who input data P (the number of times of data inputting) is zero.

Next, in the path Y, an operator, Mr. A, inputs data (step S12). A result of the character recognition (text string) obtained in step S11 and a result of the data inputting (text string) performed by Mr. A in step S12 are then matched (step S13). If the result of the character recognition and the result of the data inputting match in step S13, the text string is output. If the result of the character recognition and the result of the data inputting do not match in step S13, another operator, Mr. D, inputs data (step S14). A result of the data inputting performed by Mr. D in step S14 is then output as a text string. Here, the process performed between the classification of the character strings in step S11 and the matching in step S13 will be referred to as a "first process", and the process performed after the matching will be referred to as a "second process". In the path Y, the number of operators who input data (the number of times of data inputting) P in the first process is one. It is desirable that Mr. A and Mr. D be different persons so that errors do not occur due to misreading of a handwritten character string.

In the path Z, another operator, Mr. B, inputs data (step S15). Another operator, Mr. C, too, inputs data (step S16). A result of the data inputting (text string) performed by Mr. B in step S15 and a result of the data inputting (text string) performed by Mr. C in step S16 are then matched (step S17). If the two results of the data inputting (text strings) match in step S17, the text string is output. If the two results of the data inputting (text strings) do not match in step S17, another operator, Mr. E, inputs data (step S18). A result of the data inputting performed by Mr. E in step S18 is then output as a text string. In the path Z, the number of operators who input data (the number of times of data inputting) P in the first process is two. In the path Z, since the reliability of the result of the character recognition (text string) obtained in step S11 is low (reliability≤S), the result is not used. It is desirable that Mr. B, Mr. C, and Mr. E be different persons so that errors do not occur due to misreading of a handwritten character string.

The second process (steps S14 and S18) is not limited to the one described above, and another type of process may be performed. For example, the result of the data inputting (text string) performed by Mr. D in step S14 may be matched with the result of the character recognition (text string) or the result of the data inputting (text string) performed by Mr. A in step S12, instead, and if the matching is successful, the text string may be output. If the matching is not successful, another operator may input data.

A burden of data inputting performed operators is thus reduced by setting paths on the basis of the reliability of character recognition.

The first process will be mainly described hereinafter.

In the path X, the number or operators who input data (the number of times of data inputting) P is zero. This case corresponds to P(K)=0. That is, this case corresponds to the input item #2 (P(2)=0) and the input item #4 (P(4)=0).

In the path Y, the number of operators who input data (the number of times of data inputting) P in the first process is one. This case corresponds to P(K)=1. That is, this case corresponds to the input item #3 (P(3)=1).

In the path Z, the number of operators who input data (the number of times of data inputting) P in the first process is two. This case corresponds to P(K)=2. That is, this case corresponds to the input item #1 (P(1)=2).

When there are two operators for the first process in the data entry, therefore, the operators can handle any of the paths X, Y, and Z. That is M=2.

The operators input data using input terminals (input terminals 200 illustrated in FIG. 9, which will be described later), each including a display unit. Each operator inputs data using a keyboard or the like while looking at a display area (a display area 40 illustrated in FIG. 4, which will be described later) of the display unit. In the display area of the display unit, a form image 10 including reference images corresponding to input items to be referred to by the operator during data inputting and input screens (input screens 20 illustrated in FIGS. 3A to 3D, which will be described later) including input fields used by the operator during the data inputting are displayed (refer to FIG. 4, which will be described later).

First, a relationship between the form image 10 and the input screens 20 according to the present exemplary embodiment will be described.

FIGS. 3A to 3D are diagrams illustrating the relationship between the form image 10 and the input screens 20 according to the present exemplary embodiment. FIG. 3A illustrates the form image 10, and FIGS. 3B to 3D illustrate the input screens 20.

The form image 10 illustrated in FIG. 3A is generalized as with the form image 10 illustrated in FIG. 1B. The number of operators who input data P for the input items 11 is three for the input item #1 (P(1)=3), zero for the input item #2 (P(2)=0), one for the input item #K (P(K)=1), and zero for the input item #N (P(N)=0). A maximum value of the number of operators who input data P for the input items 11, therefore, is three for P(1). That is, a maximum value of the number of times of data inputting P is three.

In the example illustrated in FIG. 2, a maximum value of the number of operators who input data P is two for the input item #1 (P(1)=2). That is, a maximum value of the number of times of data inputting P is two. In this case, two operators input data in the path Z of the first process.

In FIG. 3A, on the other hand, the maximum value of the number of operators who input data P is three (P(1)=3), that is, three operators input data. The maximum value of the number of times of data inputting is three. As a result, three input screens 20 illustrated in FIG. 3B to 3D are generated. The input screens 20 will be referred to as "first to third input screen indices", respectively. The first to third input screen indices are presented to the three operators, respectively. In the input screens 20, input areas to which data is input will be referred to as "input fields 21". The input fields 21 corresponding to N input items #1 to #N will be referred to as "input fields @1 to @N". In FIGS. 3B to 3D, input fields 21 to which data is to be input are indicated in white, and input fields 21 to which data is not to be input are cross-hatched.

The input fields 21 refer to areas to which text is input as data when the operators move cursors on the input screens 20 displayed on the display units of the input terminals (the input terminals 200 illustrated in FIG. 9, which will be described later) and use the keyboards or the like.

In the first input screen index illustrated in FIG. 3B, an input field @1 corresponding to the input item #1 and an input field @K corresponding to the input item #K are provided. Input fields @2 and @N are not provided for the input items #2 and #N.

In the second input screen index illustrated in FIG. 3C, an input field @1 corresponding to the input item #1 is provided. Input fields @2, @K, and @N are not provided for the input items #2, #K, and #N.

In the third input screen index illustrated in FIG. 3D, too, an input field @1 corresponding to the input item #1 is provided. Input fields @2, @K, and @N are not provided for the input items #2, #K, and #N.

After the three input screens 20 are presented to the three operators as described above, the three operators input data for the input item #1 and one of the three operators input data for the input item #K. That is, the input items 11 in the form image 10 to which data is to be input are distributed to the plurality of input screens 20 on the basis of the number of operators who input data (the number of times of data inputting) P set for each of the input items 11.

The total number of operators who input data (the total number of times of data inputting) P for the input items 11 and the total number of input fields 21 in the plurality of input screens 20 match. As a result, data inputting is performed properly with the number of operators who input data (the number of times of data inputting) P set in advance.

Even if a new input screen 20 is provided, therefore, no input fields are provided.

If the total number of operators who input data (the total number of times of data inputting) is smaller than the total number of input fields 21, necessary data inputting operations are not performed (data inputting operations are insufficient). If the total number of operators who input data (the total number of times of data inputting) is larger than the total number of input fields 21, redundant data inputting is performed.

The input field @K provided for the input item #K in the first input screen index (FIG. 3B) may be provided for another input screen 20, such as the second input screen index or the third input screen index, instead. Alternatively, the input field @K may be provided for a new input screen 20 other than the first to third input screen indices. In this case, there are four input screens 20. That the number of operators who input data P is four.

As illustrated in FIGS. 3A to 3D, therefore, the number of operators who input data P becomes minimal by providing the input field @1 and the input field @K for the first input screen index to make the number of input screens 20 the same as the maximum value of the number of operators who input data (the number of times of data inputting) P, that is, by determining the number of input screens 20 as the maximum value of the number of operators who input data (the number of times of data inputting) P.

As illustrated in FIGS. 33 to 3D, input fields 21 are not provided for parts of the input screens 20 (the first to third input screen indices) corresponding to input items 11 to which data is not to be input. Content of the input items 11 may be displayed in these parts. The operators might be able to input data to the input fields 21 more easily by referring to the content of the input items 11. It is also desirable to make the operators recognize that these parts are not input fields 21. For example, a different display color or a different level of brightness may be used for these parts, or these parts may be hatched. How the operators can input data to the input fields 21 more easily will be described later. In the input screens 20, the reference images, which are images of image areas corresponding to the input items 11 to which data is not to be input, need not be displayed.

FIG. 4 is a diagram illustrating an example of a display area 40 of each of the display units of the input terminals (the input terminals 200 illustrated in FIG. 9, which will be described later) used by the operators.

In an example, a form image 10 and an input screen 20 configured on the basis of input screen information 30 are displayed side by side in the display area 40 of each of the display units of the input terminals used by the operators. Input items 11 in the form image 10 and input fields 21 in the input screen 20 are also displayed side by side so that correspondences between the input items 11 and the input fields 21 become visible. If the entirety of the input screen information 30 is not presented in the display area 40, which is the display unit of the input terminal 200, the rest of the input screen information 30 is presented to the operator by vertically scrolling the display area 40 or changing pages. It is desirable that the scrolling or the changing of pages be performed in the input screen information 30 such that the form image 10 and the input screen 20 move in a coordinated manner.

The operator understands the correspondences between the reference images corresponding to the input items 11 and the input fields 21, and inputting errors are reduced in data inputting.

In FIG. 4, the input fields 21 in the input screen 20 are provided for all the input items 11 in the form image 10. As described above, however, the input fields 21 need not be provided in the input screen 20 for all the input items 11 in the form image 10. Among the reference images included in the form image 10, only reference images corresponding to the input fields 21 provided in the input screen 20 may be displayed, instead.

The present exemplary embodiment will be further described hereinafter with reference to the flowchart of FIG. 2.

Figure 5A:
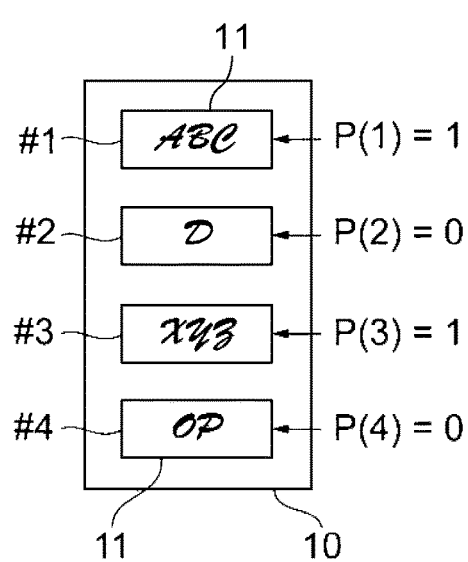
FIGS. 5A and 5B are diagrams illustrating a case where a maximum value of the number of operators who input data (the number of times of data inputting) for input items is one.
Figure 5B:
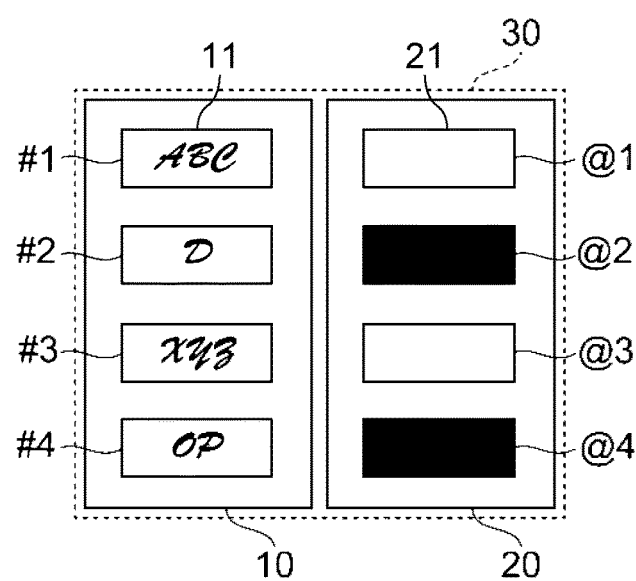

FIGS. 5A and 5B are diagrams illustrating a case where a maximum value of the number of operators who input data (the number of times of data inputting) P for the input items 11 is one. FIG. 5A illustrates a form image 10, and FIG. 5B illustrates input screen information 30.

As illustrated in FIG. 5A, the number of operators who input data (the number of times of data inputting) P(1) for the input item #1 is one, the number of operators who input data (the number of times of data inputting) P(2) for the input item #2 is zero, the number of operators who input data (the number of times of data inputting) P(3) for the input item #3 is one, and the number of operators who input data (the number of times of data inputting) P(4) for the input item #4 is zero. In this case, the paths X and Y are used but the path Z is not used in FIG. 2. That is, one operator is enough to input data.

As illustrated in FIG. 5B, therefore, the input screen information 30 may be one piece of information presented to the operator, Mr. A.

As illustrated in FIG. 5B, the input field @1 corresponding to the input item #1 (P(1)=1) and the input field @3 corresponding to the input item #3 (P(3)=1) are provided for an input screen 20 of the input screen information 30. Input fields 21 corresponding to the input item #2 (P(2)=0) and the input item #4 (P(4)=0) are indicated in black and reject data inputting.

Alternatively, the input fields @1 and @3 may be presented using two pieces of input screen information 30. In this case, two operators are needed to input data.

FIGS. 6A to 6C are diagrams illustrating a case where the maximum value of the number of operators who input data (the number of times of data inputting) P for the input items 11 is two. FIG. 6A illustrates the form image 10, and FIGS. 6B and 6C illustrate input screen information 30.

As illustrated in FIG. 6A, the number of operators who input data (the number of times of data inputting) P(1) for the input item #1 is two, the number of operators who input data (the number of times of data inputting) P(2) for the input item #2 is zero, the number of operators who input data (the number of times of data inputting) P(3) for the input item #3 is one, and the number of operators who input data (the number of times of data inputting) P(4) for the input item #4 is zero. In this case, the paths X to Z are used in FIG. 2. That is, two operators are enough to input data.

As illustrated in FIGS. 6B and 6C, therefore, the input screen information 30 may be two piece of information presented to the operators, Mr. B and Mr. C.

As illustrated in FIG. 6B, the input field @1 corresponding to the input item #1 (P(1)=2) and the input field @3 corresponding to the input item #3 (P(3)=1) are provided for an input screen 20 of the input screen information 30. Input fields 21 corresponding to the input item #2 (P(1)=0) and the input item #4 (P(4)=0) are indicated in black and reject data inputting.

As illustrated in FIG. 6C, the input field @1 corresponding to the input item #1 (P(1)=2) is provided for an input screen 20 of the input screen information 30. Input fields 21 corresponding to the input item #2 (P(1)=0), the input item #3 (P(3)=1), and the input item #4 (P(4)=0) are displayed in black and reject data inputting. That is, since the input field @3 corresponding to the input item #3 is provided for the input screen 20 for Mr. B illustrated in FIG. 6B, the input field @3 is not provided for the input screen 20 for Mr. C. Alternatively, the input field @3 corresponding to the input item #3 may be provided for the input screen 20 for Mr. C, instead of the input screen 20 for Mr. B illustrated in FIG. 6B.

As illustrated in FIG. 6B, Mr. B inputs data to the input item #3 corresponding to the path Y. An input screen 20 (input screen information 30) for Mr. A, therefore, need not be separately provided. If an input screen 20 (input screen information 30) for Mr. A was separately generated, three operators (Mr. A, Mr. B, and Mr. C) would input data.

Next, the second process will be described.

FIGS. 7A to 7C are diagrams illustrating an example of input screen information 30 in the second process illustrated in FIG. 2. FIG. 7A illustrates the form image 10, and FIGS. 7B and 7C illustrate the input screen information 30. The form image 10 illustrated in FIG. 7A is the same as that illustrated in FIG. 6A.

In FIG. 2, if the result of the matching step S13 in the path Y or the result of the matching in step S17 in the path Z is positive, a text string is output, and the process ends. Now, a case where the result of the matching in step S13 or S17 is negative will be described.

First, a case where the result of the matching in step S13 in the path Y is positive and the result of the matching in step S17 in the path Z is negative will be described with reference to FIG. 7B. In this case, Mr. E inputs data in step S18. Here, the input screen information 30 illustrated in FIG. 7B is presented to Mr. E. That is, since the result of the matching in step S17 in the path Z is negative, the result of the data inputting (text string) performed by Mr. B and the result of the data inputting (text string) performed by Mr. C for the input item #1 do not match. As a result, input screen information 30 including an input screen 20 for which an input field @1 corresponding to the input item #1 is created and presented to Mr. E.

Next, a case where the result of the matching in step S13 in the path Y is negative and the result of the matching in step S17 in the path Z is positive will be described with reference to FIG. 7C. In this case, Mr. D inputs data in step S14. Here, the input screen information 30 illustrated in FIG. 7C is presented to Mr. D. That is, since the result of the matching in step S13 in the path Y is negative, the result of the character recognition and the result of the data inputting (text string) performed by Mr. A for the input item #3 do not match. As a result, input screen information 30 including an input screen 20 for which an input field @3 corresponding to the input item #3 is created and presented to Mr. D.

Figure 8A:
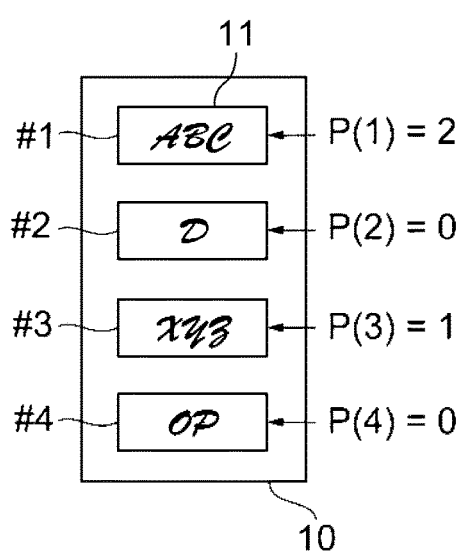
FIGS. 8A and 8B are diagrams illustrating another example of the input screen information in the second process illustrated in FIG. 2.
Figure 8B:
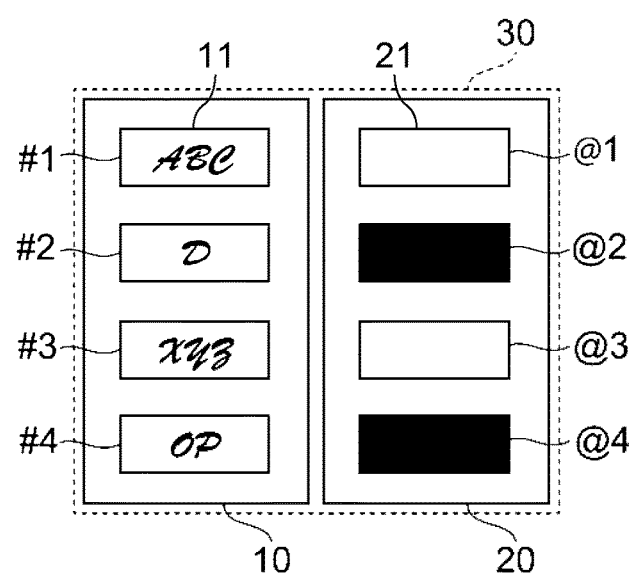

FIGS. 8A and 8B are diagrams illustrating another example of the input screen information 30 in the second process illustrated in FIG. 2. FIG. 8A illustrates the form image 10, and FIG. 8B illustrates the input screen information 30. The form image 10 illustrated in FIG. 8A is the same as that illustrated in FIG. 67A.

A case where the results of the matching performed in steps S13 and S17 are both negative in FIG. 2 will be described.

If the result of the matching in step S13 in the path Y is negative and the result of the matching in step S17 in the path 7, is negative, Mr. D inputs data in step S14 and Mr. E inputs data in step S18. It is assumed here that Mr. D inputs data. The input screen information 30 illustrated in FIG. 8B is presented to Mr. D. That is, since the result of the matching in step S13 in the path Y is negative, the result of the character recognition (text string) and the result of the data inputting (text string) performed by Mr. A for input item #3 do not match. As a result, an input screen 20 for which an input field @3 corresponding to the input item #3 is created. Since the result of the matching in step S17 in the path Z is negative, the result of the data inputting (text string) performed by Mr. B and the result of the data inputting (text string) performed by Mr. C for the input item #1 do not match. As a result, an input field @1 corresponding to the input item #1 is created in the input screen 20. That is, as illustrated in FIG. 8B, the input fields @1 and @3 are provided for the input screen 20. The input screen information 30 including the input screen 20 is then presented to Mr. D. Alternatively, the input screen information 30 may be presented to Mr. E.

An input screen 20 including the input field @1 corresponding to the input item #1 and an input screen 20 including the input field @3 corresponding to the input item #3 may be separately created, instead. In this case, two operators (Mr. D and Mr. E) input data.

Image Processing Apparatus 100

FIG. 9 is a diagram illustrating an example of the functional configuration of the image processing apparatus 100 that generates input screen information 30 for data entry.

The image processing apparatus 100 includes a form image reception unit 110 that receives a form image 10, an obtaining unit 120 that obtains input items 11 included in the form image 10 to which data needs to be input and the number of operators who input data (the number of times of data inputting) P, an input screen information generation unit 130 that generates input screen information 30, an input screen information presentation unit 140 that presents the input screen information 30 to operators, a data inputting result obtaining unit 150 that obtains results of data inputting (text strings), a processing unit 160 that processes the obtained data, and a text string output unit 170 that outputs the text strings.

The obtaining unit 120 is an example of an obtaining unit, and the input screen information generation unit 130 is an example of an input screen information generation unit.

The input screen information generation unit 130 includes an input screen generation section 131 that generates an input screen 20 and an input screen layout section 132 that lays out input screen information 30 from a form image 10 and the input screen 20. Here, the input screen layout section 132 lays out input screen information 30 by combining a form image 10 and an input screen 20. When an operator directly inputs data to input fields 21 of an input screen 20 while referring to sheet information, however, input screen information 30 need not be laid out from a form image 10 and the input screen 20. In this case, the input screen layout section 132 lays out input screen information 30 from an input screen 20. That is, input screen information. 30 generated by the input screen information generation unit 130 includes an input screen 20 but might not include a form image 10.

The operation of the image processing apparatus 100 will be described.

The form image reception unit 110 receives a form image 10 for data entry. The obtaining unit 120 then obtains input items 11 included in the form image 10 to which data needs to be input and the number of operators who input data. (the number of times of data inputting) P. The obtaining unit 120 may determine predetermined input items 11 to which data needs to be input and the number of operators who input data (the number of times of data inputting) P on the basis of positions of input items 11 included in the form image 10. At this time, a table including the input items 11 to which data needs to be input and the number of operators who input data (the number of times of data inputting) P may be prepared, and the input items 11 to which data needs to be input and the number of operators who input data (the number of times of data inputting) P may be obtained by referring to the table. Alternatively, the obtaining unit 120 may obtain input items 11 to which data needs to be input and the number of operators who input data (the number of times of data inputting) P on the basis of, for example, a name provided for the input items 11 of the form image 10. The input items 11 to which data needs to be input and the number of operators who input data (the number of times of data inputting) P may be obtained using another method, instead.

The form image reception unit 110 may include a character recognition device such as an OCR device or a character recognition unit or a device or a unit that determines the reliability of character recognition. In this case, the obtaining unit 120 may obtain input items 11 to which data needs to be input and the number of operators who input data (the number of times of data inputting) P on the basis of the reliability of character recognition determined by the form image reception unit 110.

Next, the input screen generation section 131 of the input screen information generation unit 130 generates an input screen 20 for each operator on the basis of the input items 11 to which data needs to be input and the number of operators who input data (the number of times of data inputting) P obtained by the obtaining unit 120 (refer to FIGS. 3A to 3D).

The input screen layout section 132 of the input screen information generation unit 130 lays out input screen information 30 for each operator from an input screen 20 and a form image 10 generated by the input screen generation section 131 for the operator. The input screen layout section 132 lays out, for each operator, input screen information 30 in which, for example, a form image 10 and an input screen 20 are arranged side by side (refer to FIG. 4).

The input screen information presentation unit 140 then displays the input screen information 30 generated by the input screen information generation unit 130 for each operator on a display unit of an input terminal 200 provided for the operator.

The display unit of the input terminal 200 displays the input screen information 30 obtained from the input screen information presentation unit 140 of the image processing apparatus 100. The input screen information 30 may be, for example, data written in hypertext markup language (HTML), drawing data, or image data. When the input terminal 200 includes an application program having display and input functions for a display area 40 of the display unit thereof, the application program of the image processing apparatus 100 may display, in the display area 40 of the display unit, only input screen information 30 regarding reference images and input items. An input terminal 200 need not be provided for each operator. A plurality of operators may use a single input terminal 200 by turns. That is, the operators may be identified, and input screen information 30 may be presented to each operator.

The data inputting result obtaining unit 150 obtains results of data inputting (text strings) for each operator. The processing unit 160 processes the results of the data inputting obtained for each operator to obtain text strings corresponding to the input items 11. The process performed by the processing unit 160 is, for example, the matching in steps S13 and S17 illustrated in FIG. 2.

The text string output unit 170 outputs the text strings corresponding to the input items 11. The text string output unit 170 may output a data file including information regarding a form and the text strings corresponding to the input items 11 or associate information regarding a form and the text strings corresponding to the input items 11 with each other and register the information and the text strings to a database. As a result, the data entry is completed.

Hardware Configuration of Image Processing Apparatus 100

Figure 10:
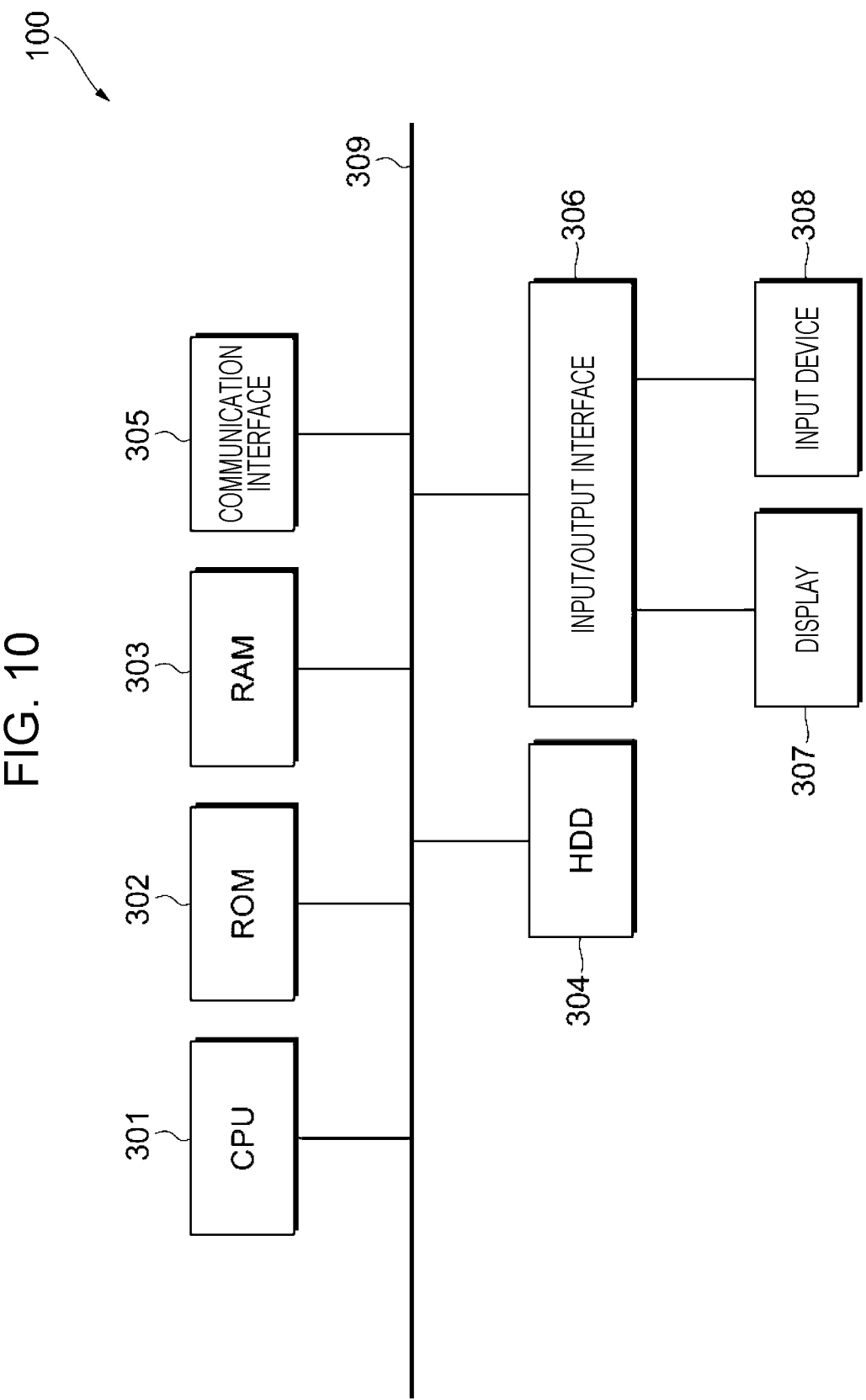
FIG. 10 is a diagram illustrating the hardware configuration of the image processing apparatus.

FIG. 10 is a diagram illustrating the hardware configuration of the image processing apparatus 100.

The image processing apparatus 100 includes a central processing unit (CPU) 301, a read-only memory (ROM) 302, a random-access memory (RAM) 303, a hard disk drive (HDD) 304, a communication input/output interface (communication interface) 305, an input/output interface 306, a display 307 connected to the input/output interface 306, an input device 308 connected to the input/output interface 306, and a bus 309.

The ROM 302 is a nonvolatile memory that maintains stored (written) data even while no power is supplied. The ROM 302 is, for example, an erasable programmable read-only memory (EPROM), an electrically erasable programmable read-only memory (EEPROM), a flash memory, or the like. The ROM 302 stores application software (programs) for operating the image processing apparatus 100 and data used by the programs, such as constants and initial values of variables.

The RAM 303 is a volatile memory whose data is lost once supply of power stops. The RAM 303 reads data faster than the ROM 302. The RAM 303 is, for example, a dynamic random-access memory (DRAM). The programs and the data stored in the ROM 302 are read and loaded into the RAM 303 in an executable manner. The RAM 303 also serves as a working area storing data for operating the image processing apparatus 100.

The HDD 304 is a rewritable nonvolatile memory that maintains stored (written) data even while no power is supplied and stores a large amount of data. As with the ROM 302, the HDD 304 may store application software (programs) for operating the image processing apparatus 100 and data used by the programs, such as constants and initial values of variables.

The bus 309 is connected to the CPU 301, the ROM 302, the RAN 303, the HDD 304, the communication interface 305, and the input/output interface 306 and used by the CPU 301 to input and output programs and data.

The communication interface 305 is an interface for obtaining a form image 10. The communication interface 305 is an interface with the input terminals 200. Although a form image 10 is received from the outside of the image processing apparatus 100 in FIG. 9, the RAM 303 or the HDD 304 included in the image processing apparatus 100 may store the form image 10, instead.

The input/output interface 306 is connected to the display 307 and the input device 308. The display 307 is a liquid crystal display (LCD) or the like on which images can be viewed. The input device 308 is a device for issuing instructions to the CPU 301 and is, for example, a keyboard, a touch panel, a switch, or the like. The image processing apparatus 100 need not include the display 307 and/or the input device 308.

After power is supplied, the CPU 301 reads a program and data stored in the ROM 302 (or the HDD 304) and loads the program and the data into the RAM 303 in an executable manner. The CPU 301 then executes the program and communicates data with the HDD 304, the communication interface 305, and the input/output interface 306.

Although the ROM 302, the RAM 303, and the HDD 304 are provided in the above description, the ROM 302, the RAM 303, and/or the HDD 304 may be rewritable nonvolatile memories, instead. The rewritable nonvolatile memories may be flash memories or the like. In addition, the ROM 302 and the RAM 303 may be integrated with the CPU 301. In this case, the ROM 302 and the RAM 303 may be rewritable nonvolatile memories. The rewritable nonvolatile memories may be flash memories or the like.

The input terminals 200 used by the operators to input data also have the hardware configuration illustrated in FIG. 10. The display unit of each input terminal 200 is the display 307. An input screen is displayed on the display 307, and data is input using the keyboard, which is the input device 308.

The communication interface 305 of the image processing apparatus 100 and the communication interfaces 305 of the input terminals 200 may be connected to each other through a wired network, a wireless network, a network obtained by combining a wired network and a wireless network, or the like used for a local area network (LAN), a metropolitan area network (MAN), a wide area network (WAN), the Internet, an intranet, or the like.

Operation of Input Screen Generation Section 131

Figure 11:
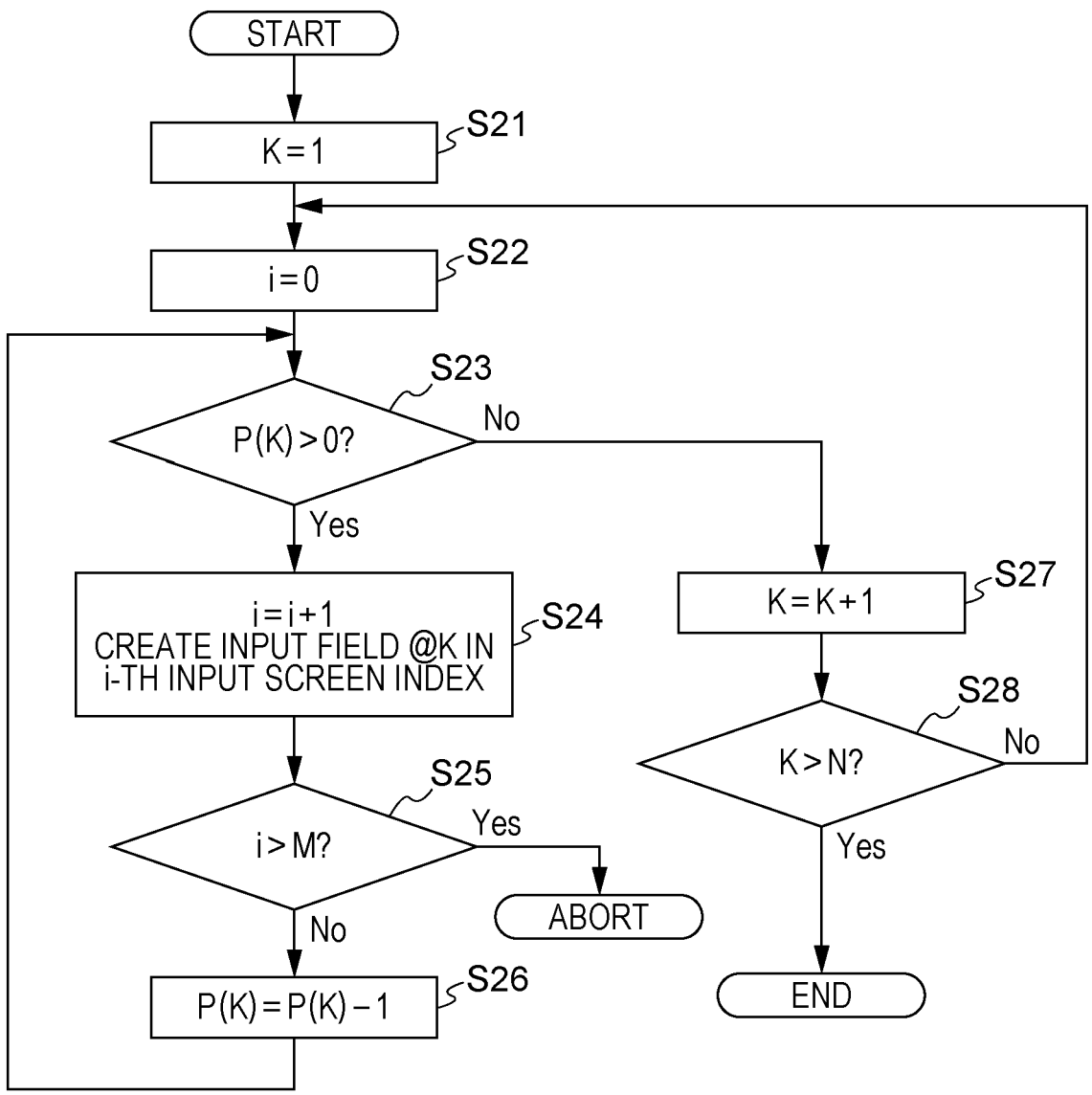
FIG. 11 is a flowchart illustrating a method for generating an input screen for each operator used by an input screen generation section of an input screen information generation unit.

FIG. 11 is a flowchart illustrating a method for generating an input screen 20 for each operator used by the input screen generation section 131 of the input screen information generation unit 130.

As described with reference to FIGS. 1A and 1B, the number of input items 11 included in the form image 10 is denoted by N, and the number of operators is denoted by M. That is, there are N input items 11, namely input items #1 to #N. The number of operators who input data (the number of times of data inputting) P is set for each input item 11. The number of operators who input data (the number of times of data inputting) for an input item #K is denoted by P(K).

First, an outline of the flowchart of FIG. 11 will be described. Here, if P(K)>0, an input field @K corresponding to the input item #K is created by generating an input screen 20. P(K) is then decreased by one (P(K)=P(K)−1). This process is repeated until P(K) becomes zero (P(K)=0). This repetition is performed for all the input items 11 (K=1 to N). At this time, if an input screen 20 has been generated for another input item 11 (different K), a new input screen 20 is not generated.

The flowchart of FIG. 11 will be described in detail hereinafter.

First, a variable K is set to one (step S21). The variable K corresponds to a number of an input item 11. That is, K=1 corresponds to the input item #1, and K=2 corresponds to the input item #2. The same holds for other values of the variable K.

Next, a variable i is set to zero (step S22). The variable i corresponds to an input screen index of an input screen 20 to be generated.

Next, whether P(K) exceeds zero (P(K)>0) is determined (step S23). If a result of step S23 is positive (YES), that is, if P(K) exceeds zero (P(K)>0), the input field @K corresponding to the input item #K is then created (step S24). That is, the variable i is increased by one. The input field @K corresponding to the input item #K is created in an i-th input screen 20 (an i-th input screen index).

Next, whether i exceeds N is determined (step S25). If a result of step S25 is positive (YES), that is, if the number i of input screens 20 exceeds the number M of operators, data entry is not possible. The data entry, therefore, stops. Since the number of operators is insufficient, more operators are needed.

If the result of step S25 is negative (NO), on the other hand, that is, if the number i of input screens 20 is equal to or smaller than the number M of operators, data entry is possible.

In this case, P(K) is decreased by one (P(K)=P(K)−1) (step S26). The process then returns to step S23.

If the result of step S23 is negative (NO), that is, P(K) is zero, the input field @K corresponding to the input item #K need not be created. K, therefore, is increased by one (K=K+1) (step S27). That is, the process proceeds to a next input item 11.

Whether K exceeds N is then determined (step S28). If a result of step S28 is positive (YES), that is, if K exceeds N, the process ends. Since there are only N input items 11, there is no K-th input item 11 in this case.

If the result of step S28 is negative (NO), on the other hand, that is, if K is equal to or smaller than N, the process returns to step S22. That is, in step S22, the number of the input screen 20 (i-th input screen index) is reset to zero. Input fields 21 are then created for a next input item 11.

If the number of operators who input data (the number of times of data inputting) P(K) is zero in advance, the result of step S23 becomes negative (NO), and the process proceeds to a next input item 11.

After the input fields 21 are distributed to the input screens 20, the input fields 21 are assigned to the input screen 20 in ascending order of the input screen index (in ascending order of i).

If there is input screen 20 corresponding to the i-th input screen index after the variable i is increased by one in step S24, an input screen 20 corresponding to the i-th input screen index is added, and input fields 21 are created in the input screen 20 corresponding to the i-th input screen index. If there is an input screen 20 corresponding to the i-th input screen index, input fields 21 are created in the input screen 20 corresponding to the i-th input screen index.

Figure 12:
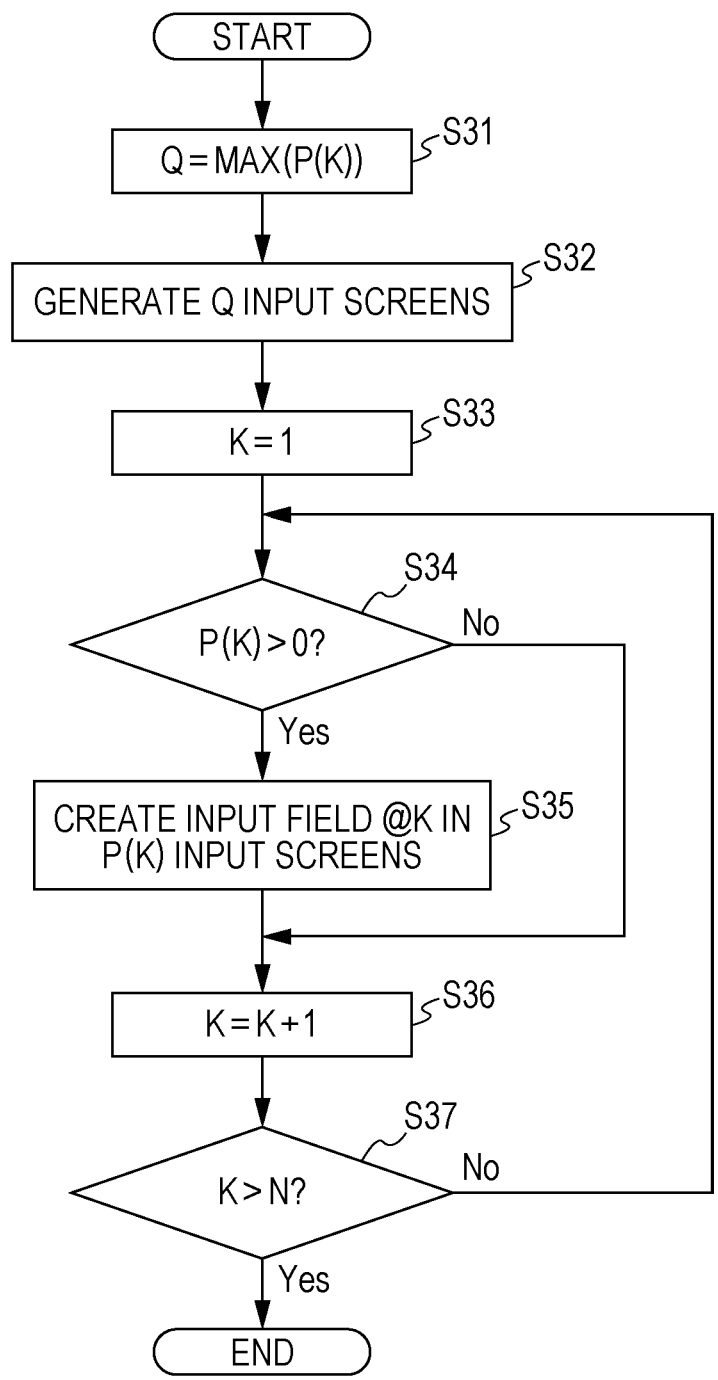
FIG. 12 is a flowchart illustrating another method for generating an input screen for each operator used by the input screen generation section of the input screen information generation unit.

FIG. 12 is a flowchart illustrating another method for generating an input screen 20 for each operator used by the input screen generation section 131 of the input screen information generation unit 130.

First, an outline of the flowchart of FIG. 12 will be described. Here, a maximum value Q of the number of operators who input data (the number of times of data inputting) P is obtained, and then input screens 20 as many as the maximum value Q are generated. Input fields 21 are then assigned to these input screens 20.

The flowchart of FIG. 12 will be described in detail hereinafter.

A maximum value Q (Q is an integer equal to or larger than 1) of the number of operators who input data (the number of times of data inputting) P(K) is obtained for input items 11 in a form image 10 (step S31). MAX(P(K)) denotes the maximum value of P(K).

Next, Q input screens 20 corresponding to the maximum value Q are generated (step S32). That is, input screens 20 corresponding to input screen indices 1 to Q are generated.

K is then set to one (step S33). Next, whether P(K) exceeds zero is determined (step S34). If a result of step S34 is positive (YES), an input field @K corresponding to an input item #K is created for each of P(K) input screens 20 among the Q input screens 20 (step S35). An input field @K is not created for each of remaining (Q−P(K)) input screens 20.

Next, K is increased by one (K=K+1) (step S36). That is, the process proceeds to a next input item 11. If the result of step S34 is negative (NO), that is, if P(K) is zero, the process skips step S35 and proceeds to step S36.

Whether K exceeds N is then determined (step S37). If a result of step S37 is positive (YES), that is, if K exceeds N (K>N), there are no more input items 11, and the process ends.

If the result of step S37 is negative (NO), that if K is equal to or smaller than N (K≤N), on the other hand, the process returns to step S34. That is, the process proceeds to a next input item 11.

When the input field @K corresponding to the input item #K is created for each of the P(K) input screens 20 among the Q input screens 20 in step S35, the P(K) input screens 20 may be arbitrarily (randomly) selected. That the input field @K is provided for one of the arbitrarily selected P(K) input screens 20. In doing so, no imbalance in data inputting is caused between the operators.

As in FIG. 11, input screens 20 may be selected in ascending or descending order of the input screen index. Alternatively, the number of input fields 21 in input screens 20 corresponding to certain input screen indices may be larger than the number of input fields 21 in input screens 20 corresponding to other input screen indices. In this case, the operators perform data inputting in accordance with their capacities.

Although Q input screens 20 corresponding to the maximum value Q are generated in step S32, R input screens 20 (R is an integer larger than Q) more than the maximum value Q may be generated, instead. When R input screens 20 are generated, R operators are needed, that is, the number of operators is larger than when Q input screens 20 are generated (the minimum number of operators).

As described above, in the present exemplary embodiment, when a plurality of input items 11 are included in a form image 10 and the number of operators who input data (the number of times of data inputting) required is different between the input items 11, an input screen 20 to which input fields 21 are set are generated and presented to each operator. In doing so, necessary data inputting is performed properly. As a result, the work efficiency of data inputting improves. In particular, by setting input screens 20 as many as the maximum value of the number of operators who input data (the number of times of data inputting) P for the input items 11, the number of operators becomes minimal.

In addition, in the present exemplary embodiment, operators might not input data to all input fields 21 in input screens 20. In the input screens 20 or input screen information 30, therefore, it is desirable for the operators to be able to easily input data to the input fields 21.

Figure 13A:
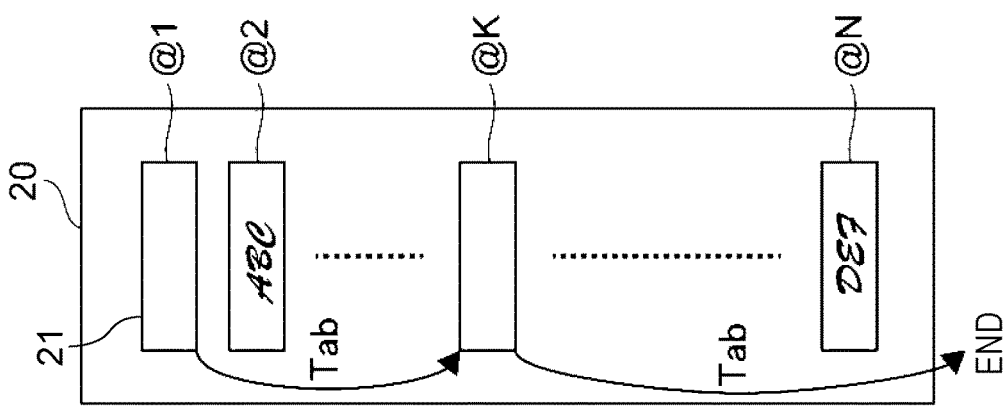
FIGS. 13A to 13D are diagrams illustrating an example of input screens that enable operators to easily input data.
Figure 13B:
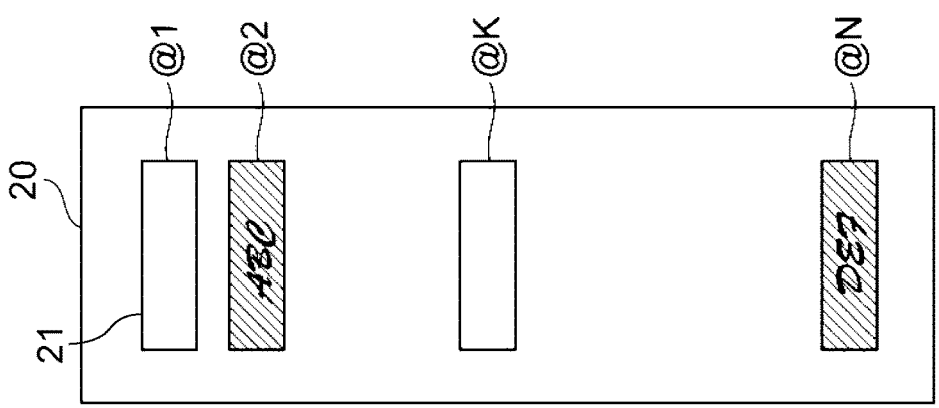
Figure 13C:
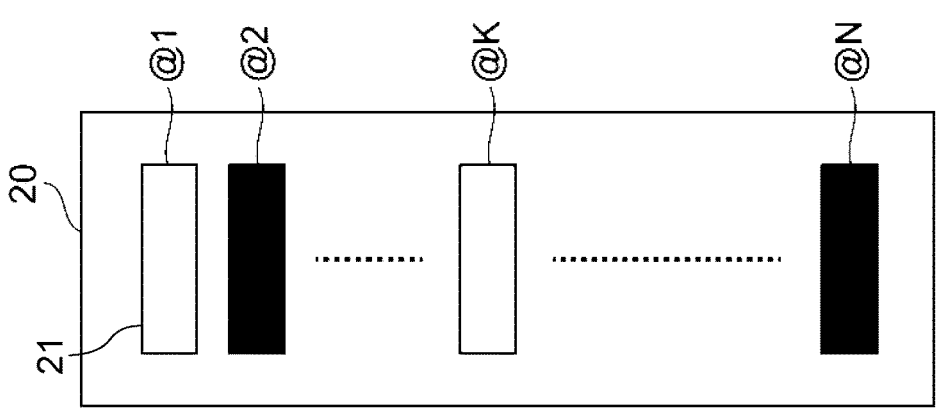
Figure 13D:
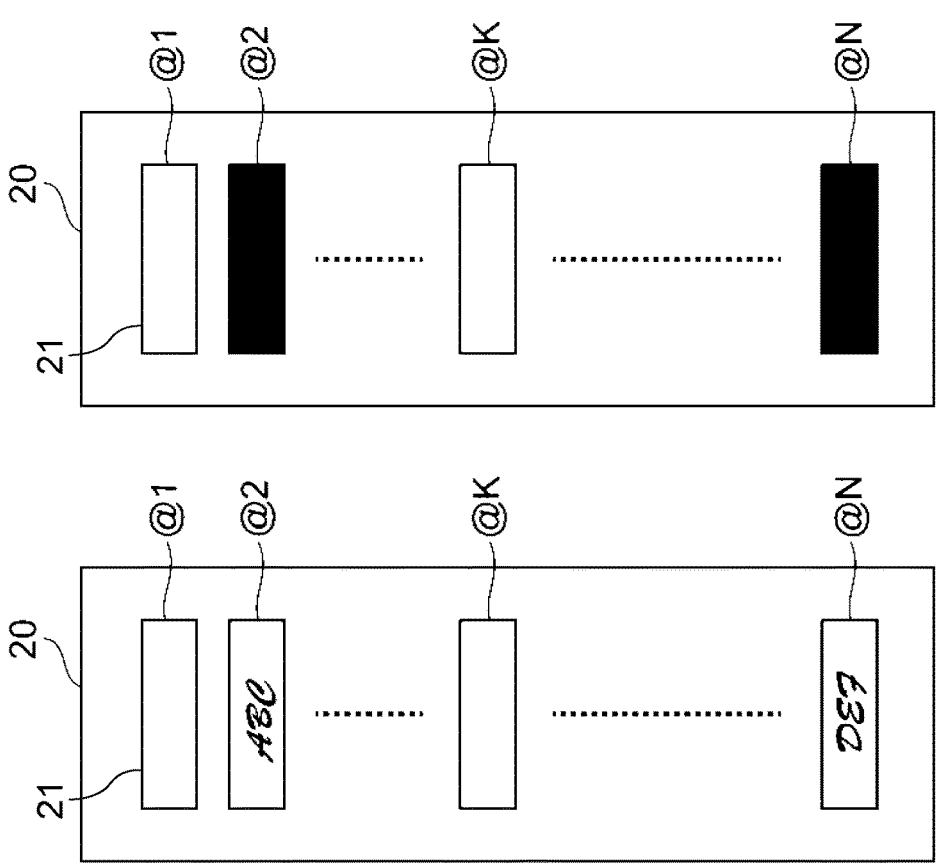

FIGS. 13A to 13D are diagrams illustrating an example of input screens 20 that enable operators to easily input data. FIG. 13A illustrates a case where input fields to which data is to be input are blank and input fields to which data is not to be input are provided with character strings. FIG. 13B illustrates a case where input fields to which data is nut to be input are displayed in black. FIG. 13C illustrates a case where input fields to which data is not to be input are hatched. FIG. 13D illustrates a case where a cursor skips input fields to which data is not to be input.

FIGS. 13A to 13D illustrate a case where data is to be input to input fields @1 and @K and data is not to be input to input fields @2 and @N.

In FIG. 13A, the input fields @1 and @K to which data is to be input are blank, and character strings are displayed in the input fields @2 and @N, to which data is not to be input. As a result, an operator understands that data need not be input to the input fields @2 and @N. The operator also understands that data needs to be input to the input fields @1 and @K. As a result, the operator does not forget to input data.

If the character strings displayed in the input fields @2 and @N, to which data is not to be input, are results of past data inputting, it is easy for the operator to input data while referring to relevant input items 11. If an input item 11 is a name, for example, it is easy for the operator to input data while referring to a pronunciation that has already been input.

In FIG. 13B, the input fields @2 and @N to which data is not to be input are displayed in black. As a result, an operator understands that data need not be input to the input fields @2 and @N.

In FIG. 13C, the input fields @2 and @N to which data is not to be input are hatched. As a result, an operator understands that data need not be input to the input fields @2 and @N. As illustrated in FIG. 3, the input fields @2 and @N may be cross-hatched, instead.

In FIG. 13D, if a tab key is pressed after data is input to an input field 21 (e.g., the input field @1), the cursor moves to a next input field 21 (e.g., the input field @K). When a series of data inputting operations has been completed, data inputting for an input screen 20 may end. At this time, the input screen 20 may be closed, and a next input screen 20 may be presented. Alternatively, when a series of data inputting operations has been completed, an end button may be displayed. An operator easily understands that data inputting has been completed.

Although input screens 20 are edited such that the operators easily inputs data in FIGS. 13A to 13D, a form image 10 may be edited.

Figure 14B:
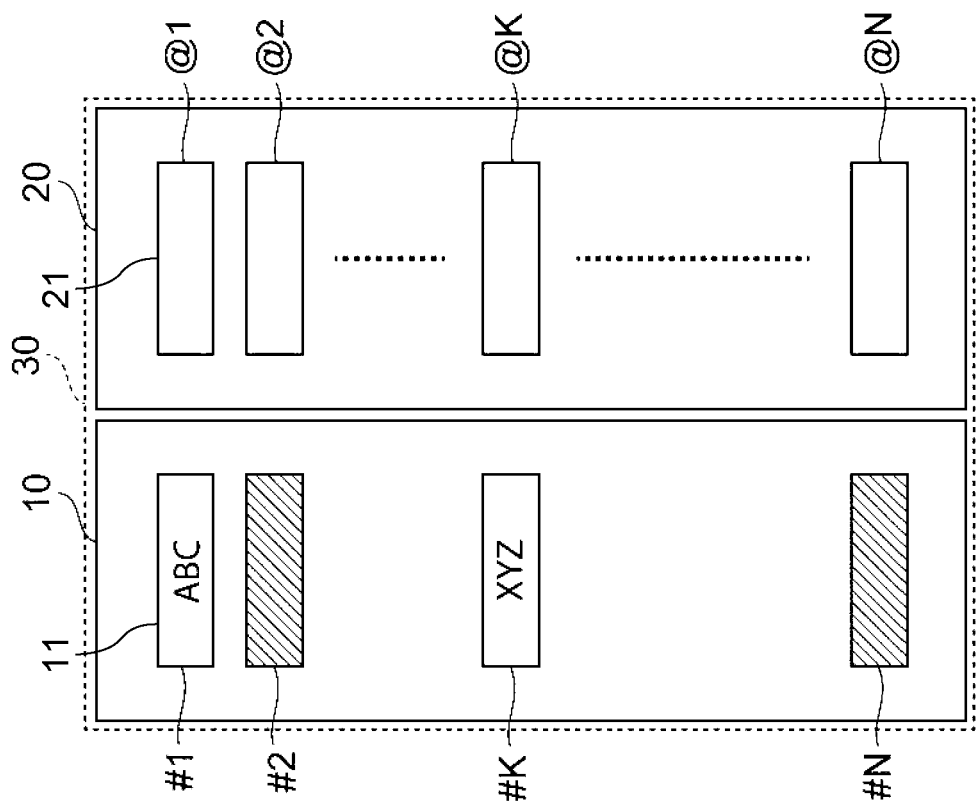
FIGS. 14A and 14B are diagrams illustrating examples of input screen information that enables operators to easily input data.
Figure 14A:
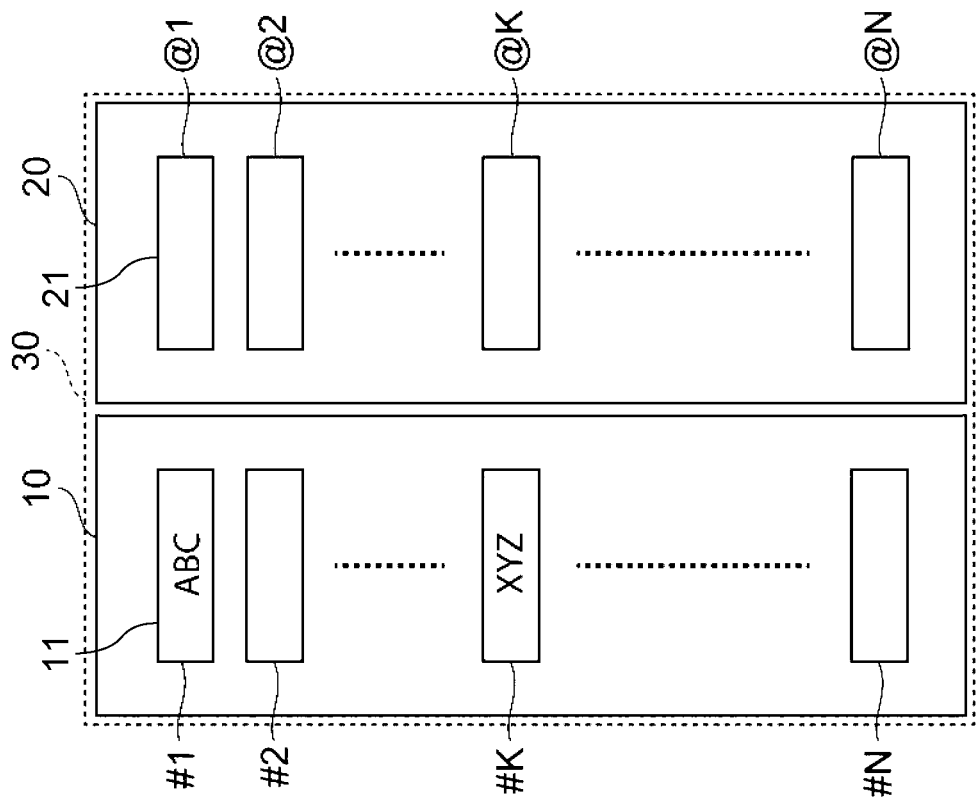

FIGS. 14A and 14B are diagrams illustrating examples of input screen information 30 that enables operators to easily input data. FIG. 14A illustrates a case where reference images in a form image 10 corresponding to input items 11 to which data is not to be input are blank, and FIG. 14B illustrates a case where reference images in the form image 10 corresponding to the input items 11 to which data is not to be input are hatched.

FIGS. 14A and 14B illustrate a case where data is to be input to input fields @1 and @K and data is not to be input to input fields @2 and @N.

As illustrated in FIG. 14A, input items #2 and #N corresponding to the input fields @2 and @N are blank. As a result, an operator understands that data need not be input to the input fields @2 and @N. Alternatively, the input items #2 and #N may be displayed in black.

As illustrated in FIG. 14B, the input items #2 and #N corresponding to the input fields @2 and @N are hatched. As a result, an operator understands that data need not be input to the input fields @2 and @N. Alternatively, the input items #2 and #N may be cross-hatched.

The editing illustrated in FIGS. 13A to 13D and FIGS. 14A and 14B may be combined with each other. Another method in which different colors, different sizes of characters, or different fonts are used may be used, instead, insofar as inputting errors (mistakes) are reduced. That is, any method may be used insofar as data inputting is permitted for input fields 21 to which data is to be input and data inputting is inhibited (prevented) for input fields 21 to which data is not to be input. In doing so, efficiency improves.

A program may cause a computer to function as obtaining means for obtaining the number of times of data inputting required for each of a plurality of input items to which operators input data and input screen information generation means for generating, for the operator on the basis of the obtained number of times of data inputting, input screen information to which the operators input data. The program may be stored in a storage medium and provided, or may be provided through communication means. In this case, the disclosure may be about a computer readable medium storing a program.

The computer readable medium storing a program refers to a computer readable medium storing a program used to install, execute, or distribute the program.

The medium may be a digital versatile disc (DVD) based on a standard specified by a DVD Forum, a compact disc (CD), a Blu-ray Disc (registered trademark), a magneto-optical (MO) disk, a flexible disk (FD), a magnetic tape, an HDD, a ROM, a flash memory, or the like.

The exemplary embodiment of the present disclosure has been described. The present disclosure includes various modifications and alterations in configuration that do not deviate from the technical scope thereof.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor programed to
determine a required number of times of data inputting required for each of a plurality of input items from which operators are to input data; and
generate, for the operators on a basis of the determined required number of times of data inputting, input screen information including a plurality of input screens to which the operators are to input data such that each input screen corresponds to an operator of the operators, wherein
the required number of times of data inputting is determined based on a reliability level of image recognition of each input item, and a number of the generated input screens including each input item is equal to the determined required number of times of data inputting.

2. The information processing apparatus according to claim 1,
wherein one data inputting operation is performed for an input field that is included in the input screen information and to which the operators are to input data.

3. The information processing apparatus according to claim 2,
wherein the input field corresponding to each of the plurality of input items is disposed in one of the plurality of input screens of the input screen information.

4. The information processing apparatus according to claim 2,
wherein there is the input field corresponding to each of the plurality of input items, and a number of input fields of some input screens of the input screen information is larger than a number of input fields of other input screens of the input screen information.

5. The information processing apparatus according to claim 1,
wherein the required number of times of data inputting is determined for each of the plurality of input items.

6. The information processing apparatus according to claim 5,
wherein the required number of times of data inputting is set in accordance with a number of characters of each of the plurality of input items.

7. The information processing apparatus according to claim 5,
wherein the required number of times of data inputting is set in accordance with a predetermined characteristic of each of the plurality of input items.

8. The information processing apparatus according to claim 1,
wherein the input screen information includes reference images corresponding to the plurality of input items and input fields to which the operators input data.

9. The information processing apparatus according to claim 8,
wherein the input screen information includes reference images corresponding to all the plurality of input items.

10. The information processing apparatus according to claim 8,
wherein, among the plurality of input items included in the input screen information, the data inputting is permitted for input fields for which the operators are to input data.

11. The information processing apparatus according to claim 10,
wherein the input fields for which the data inputting has been permitted are blanks.

12. The information processing apparatus according to claim 8,
wherein, among the plurality of input items included in the input screen information, the data inputting is inhibited for input fields for which the operators are not to input data.

13. The information processing apparatus according to claim 12,
wherein results of past data inputting are displayed in the input fields for which the data inputting has been inhibited.

14. The information processing apparatus according to claim 1,
wherein each input item is a character string from an image of a form.

15. The information processing apparatus according to claim 1,
wherein the reliability level of image recognition is one of a plurality of levels including a first level and a second level lower than the first level, and
the processor is programed to
determine that the required number of data inputting is greater than one in response to the reliability level of image recognition being the second level, and
determine that the required number of data inputting is less than or equal to one in response to the reliability level of image recognition being the first level.

16. A non-transitory computer readable medium storing a program causing a computer to execute a process, the process comprising:
determining a required number of times of data inputting required for each of a plurality of input items from which operators are to input data; and
generating, for the operators on a basis of the determined required number of times of data inputting, input screen information including a plurality of input screens to which the operators are to input data such that each input screen corresponds to an operator of the operators, wherein
the required number of times of data inputting is determined based on a reliability level of image recognition of each input item, and
a number of the generated input screens including each input item is equal to the determined required number of times of data inputting, and
a number of the generated input screens including each input item is equal to the determined required number of times of data inputting.

17. The non-transitory computer readable medium according to claim 16,
wherein each input item is a character string from an image of a form.

18. The non-transitory computer readable medium according to claim 16,
wherein the reliability level of image recognition is one of a plurality of levels including a first level and a second level lower than the first level, and
the process further comprises
determining that the required number of data inputting is greater than one in response to the reliability level of image recognition being the second level, and
determining that the required number of data inputting is less than or equal to one in response to the reliability level of image recognition being the first level.

19. An information processing apparatus comprising:
determine means for obtaining a required number of times of data inputting required for each of a plurality of input items from which operators are to input data; and
input screen information generation means for generating, for the operators on a basis of the determined required number of times of data inputting, input screen information including a plurality of input screens to which the operators are to input data such that each input screen corresponds to an operator of the operators, wherein
the required number of times of data inputting is determined based on a reliability level of image recognition of each input item, and a number of the generated input screens including each input item is equal to the determined required number of times of data inputting.

20. The information processing apparatus according to claim 19, wherein each input item is a character string from an image of a form.

21. The information processing apparatus according to claim 19, wherein the reliability level of image recognition is one of a plurality of levels including a first level and a second level lower than the first level, and the determine means determines that the required number of data inputting is greater than one in response to the reliability level of image recognition being the second level, and determines that the required number of data inputting is less than or equal to one in response to the reliability level of image recognition being the first level.

* * * * *